(12) United States Patent
Campbell et al.

(10) Patent No.: US 9,713,227 B2
(45) Date of Patent: Jul. 18, 2017

(54) LED LIGHTING SYSTEMS

(71) Applicant: Lumenpulse Lighting Inc., Montreal (CA)

(72) Inventors: Gregory Campbell, Walpole, MA (US); Yvan Hamel, Laval (CA); Philippe Racine, Saint-Basile-le-Grand (CA); Paul Franzosa, Arlington, MA (US); James William Anderson, Montreal (CA); Casey Shea, Cambridge, MA (US)

(73) Assignee: Lumenpulse Lighting Inc. (CA)

( * ) Notice: Subject to any disclaimer, the term of this patent is extended or adjusted under 35 U.S.C. 154(b) by 0 days.

(21) Appl. No.: 14/498,456

(22) Filed: Sep. 26, 2014

(65) Prior Publication Data

US 2016/0081155 A1    Mar. 17, 2016

Related U.S. Application Data

(62) Division of application No. 13/768,805, filed on Feb. 15, 2013, now Pat. No. 9,253,852.

(60) Provisional application No. 61/599,037, filed on Feb. 15, 2012.

(51) Int. Cl.
  *H05B 33/08* (2006.01)
  *H05B 37/02* (2006.01)

(52) U.S. Cl.
  CPC ..... *H05B 37/0218* (2013.01); *H05B 33/0818* (2013.01); *H05B 33/0851* (2013.01); *H05B 33/0884* (2013.01); *H05B 37/02* (2013.01); *H05B 37/0263* (2013.01); *Y02B 20/46* (2013.01)

(58) Field of Classification Search
  USPC .......................................................... 315/152
  See application file for complete search history.

(56) References Cited

U.S. PATENT DOCUMENTS

| | | | |
|---|---|---|---|
| 4,233,545 | A | 11/1980 | Webster et al. |
| 5,589,741 | A | 12/1996 | Terman et al. |
| 5,946,209 | A | 8/1999 | Eckel et al. |
| 6,388,399 | B1 | 5/2002 | Eckel et al. |
| 6,798,341 | B1 | 9/2004 | Eckel et al. |
| 7,490,957 | B2 | 2/2009 | Leong et al. |
| 7,800,315 | B2 | 9/2010 | Shteynberg et al. |
| 8,253,349 | B2 | 8/2012 | Shteynberg et al. |
| 8,922,126 | B2 | 12/2014 | Bora et al. |
| 2005/0281030 | A1 | 12/2005 | Leong et al. |

(Continued)

FOREIGN PATENT DOCUMENTS

| | | |
|---|---|---|
| WO | 2007102097 A1 | 9/2007 |
| WO | 2010116283 A2 | 10/2010 |

(Continued)

OTHER PUBLICATIONS

Partial Supplemental Search Report from related European Application No. 13784998.0 issued May 6, 2016.

(Continued)

*Primary Examiner* — Douglas W Owens
*Assistant Examiner* — Jianzi Chen
(74) *Attorney, Agent, or Firm* — Burns & Levinson LLP; Joseph M. Maraia

(57) ABSTRACT

Light fixture systems and application of ambient light measurement for improving lighting system efficiency.

16 Claims, 21 Drawing Sheets

(56) References Cited

U.S. PATENT DOCUMENTS

| | | | |
|---|---|---|---|
| 2006/0016960 A1* | 1/2006 | Morgan | G01J 1/32 250/205 |
| 2009/0267540 A1 | 10/2009 | Chemel et al. | |
| 2010/0296285 A1 | 11/2010 | Chemel et al. | |
| 2011/0089842 A1 | 4/2011 | Aldrich et al. | |
| 2011/0214003 A1 | 9/2011 | Nara et al. | |
| 2011/0221350 A1 | 9/2011 | Staab | |
| 2012/0001567 A1 | 1/2012 | Knapp et al. | |
| 2012/0025717 A1 | 2/2012 | Klusmann et al. | |
| 2012/0086345 A1 | 4/2012 | Tran | |
| 2012/0098439 A1 | 4/2012 | Recker et al. | |
| 2012/0133298 A1 | 5/2012 | Campbell | |
| 2012/0194085 A1 | 8/2012 | King | |
| 2012/0194102 A1 | 8/2012 | King | |
| 2012/0217882 A1 | 8/2012 | Wong et al. | |
| 2012/0310703 A1 | 12/2012 | Cavalcanti et al. | |
| 2013/0063042 A1 | 3/2013 | Bora et al. | |
| 2013/0187552 A1 | 7/2013 | Frodsham et al. | |
| 2013/0257290 A1 | 10/2013 | Kurita | |

FOREIGN PATENT DOCUMENTS

| | | | |
|---|---|---|---|
| WO | 2010122457 A2 | 10/2010 | |
| WO | 2011008251 A2 | 1/2011 | |
| WO | 2011040124 A1 | 4/2011 | |
| WO | 2011/053132 A2 | 5/2011 | |

OTHER PUBLICATIONS

Office Action from related Canadian Application No. 2,864,464 issued Feb. 15, 2016.
Extended European Search Report from related European Application No. 13784998.0 issued Sep. 28, 2016.

\* cited by examiner

LED LIGHTING SYSTEMS

RELATED APPLICATIONS

The present application is a divisional of U.S. patent application Ser. No. 13/768,805, filed on Feb. 15, 2013 which claims priority to U.S. Provisional Patent Application No. 61/599,037, filed Feb. 15, 2012, the entire contents of which applications are incorporated in their entirety herein by reference.

BACKGROUND

Existing systems for setting or resetting operating parameters of light fixtures are ineffective. It is difficult to commission/install light fixtures so they operate efficiently because ambient light levels at the install site are difficult to predict. In addition, it s also difficult to acquire accurate ambient light measurements during and after installation.

SUMMARY

The technology described herein relates to setting or resetting operating parameters of light fixture systems. One implementation is a method for controlling light emitting diode (LED) light fixtures. The method includes monitoring a clock source signal to identify the presence of a feature in the clock source signal. The method also includes generating a trigger signal with a triggering module in response to identifying the presence of the feature in the clock source signal. The method also includes providing the trigger signal to each of a plurality of light fixtures to command each of the plurality of light fixtures to stop outputting light. The method also includes measuring ambient light with a light sensor located with the plurality of light fixtures.

In some embodiments, the clock source signal is an alternating voltage signal, and wherein the feature in the clock source signal is the occurrence of a zero-crossing in the alternating voltage signal. In some embodiments, the triggering commands each of the plurality of light fixtures to stop outputting light for a predefined time period. In some embodiments, an ambient light monitor measures the ambient light in response to the trigger signal.

In some embodiments, the clock source signal is: an AC or DC signal also used to provide power to the plurality of light fixtures, a power line communication signal carried by an AC or DC signal used to provide power to the plurality of light fixtures, or a signal transmitted by a clock source generator that generates the clock source signal. In some embodiments, the ambient light is measured using one or more light emitting diodes in the one or more of the plurality of light fixtures. In some embodiments, the method includes varying operating parameters of one or more of the light fixtures based on the measured ambient light.

Another implementation is a light fixture control system that includes a monitoring module that monitors a clock source signal to identify the presence of a feature in the clock source signal. The system also includes a triggering module that generates a trigger signal in response to identifying the presence of the feature in the clock source signal. The system also includes a command module that provides the trigger signal to each of a plurality of light fixtures to command each of the plurality of light fixtures to stop outputting light. The system also includes a ambient light module that monitors ambient light measured in proximity to the plurality of light fixtures.

In some embodiments, the clock source signal is an alternating voltage signal, and wherein the feature in the clock source signal is the occurrence of a zero-crossing in the alternating voltage signal. In some embodiments, the command module commands each of the plurality of light fixtures to stop outputting light for a predefined time period. In some embodiments, the ambient light module measures the ambient light in response to the trigger signal. In some embodiments, the clock source signal is: an AC or DC signal also used to provide power to the plurality of light fixtures, a power line communication signal carried by an AC or DC signal used to provide power to the plurality of light fixtures, or a signal transmitted by a clock source generator that generates the clock source signal.

In some embodiments, the ambient light is measured using one or more light emitting diodes in the one or more of the plurality of light fixtures. In some embodiments, a light fixture control module varies operating parameters of one or more of the light fixtures based on the measured ambient light.

Another implementation is a method for commissioning a lighting system. The lighting system including a plurality of light fixtures, and a plurality of light sensors, where a light sensor from the plurality of light sensors is assigned to each light fixture. The method includes measuring ambient light with the light sensor assigned to each light fixture. The method also includes designating each light fixture to a lighting group based on the ambient light measured with the light sensor assigned to each fixture.

In some embodiments, the method includes acquiring an updated measurement of ambient light with the light sensors assigned to each light fixture and designating each light fixture to a new lighting group based on the updated ambient light measurements. In some embodiments, the light sensors assigned to each light fixture include one or more light emitting diodes in the light fixture to measure the ambient light. In some embodiments, a unique light sensor is assigned to each light fixture.

In some embodiments, a light sensor is assigned to more than one light fixture. In some embodiments, the method also includes, prior to measuring ambient light with the light sensor assigned to each light fixture, monitoring a clock source signal to identify the presence of a feature in the clock source signal, and generating a trigger signal with a triggering module in response to identifying the presence of the feature in the clock source signal, and providing the trigger signal to each of the plurality of light fixtures to command each of the plurality of light fixtures to stop outputting light.

In some embodiments, the method includes making a plurality of measurements of ambient light over a period of time with the light sensor assigned to each fixture and modifying light fixture group designations based on the plurality of ambient light measurements. In some embodiments, the method includes assigning one or more of the light sensors to a different light fixture based on the ambient light measurements.

Another implementation is a lighting system commissioning apparatus. The lighting system including a plurality of light fixtures, and a plurality of light sensors, where a light sensor from the plurality of light sensors is assigned to each light fixture. The apparatus includes an ambient light module configured to measure ambient light with the light sensor assigned to each light fixture and a commissioning module configured to designate each light fixture to a lighting group based on the ambient light measured with the light sensor assigned to each fixture.

In some embodiments, the ambient light module is configured to acquire an updated measurement of ambient light with the light sensors assigned to each light fixture, and the commissioning module is configured to designate each light fixture to a new lighting group based on the updated ambient light measurements. In some embodiments, the light sensors assigned to each light fixture include one or more light emitting diodes in the light fixture to measure the ambient light. In some embodiments, a unique light sensor is assigned to each light fixture. In some embodiments, a light sensor is assigned to more than one light fixture.

In some embodiments, a monitoring module, a triggering module, and a command module. Prior to measuring ambient light with the light sensor assigned to each light fixture, the monitoring module monitors a clock source signal to identify the presence of a feature in the clock source signal, the triggering module generates a trigger signal in response to identifying the presence of the feature in the clock source signal, and the command module provides the trigger signal to each of a plurality of light fixtures to command each of the plurality of light fixtures to stop outputting light.

Another implementation is a method for commissioning a lighting system. The lighting system including a plurality of light fixtures. The method includes measuring ambient light with a light sensor located with the plurality of light fixtures. The method also includes designating one or more of the plurality of light fixtures to a first lighting group based on the measured ambient light.

Another implementation is a method for grouping light fixture in a lighting system. The method includes assigning a light sensor to each light fixture in the lighting system. The method also includes measuring ambient light with the light sensor assigned to each light fixture over a period of time. The method also includes designating each light fixture to a lighting group based on the ambient light measured with the light sensor assigned to each fixture.

Another implementation is a method for calibrating an LED light fixture that includes generating a reference light output from a light source. The method also includes measuring the reference light output from the light source by using at least one LED in the light fixture as a light sensor. The method also includes determining a calibration value by comparing the reference light output measurement to a reference value, such that by application of the calibration value to the operation of the LED light fixture, the LED light fixture will operate having properties associated with the reference value.

In some embodiments, the method includes the calibration value in a memory associated with the LED light fixture. In some embodiments, the method includes placing the light source and LED light fixture in an enclosure and, in the absence of ambient light, generating the reference light output and measuring the reference light output. In some embodiments, measuring the reference light output from the light source includes measuring the reference light output using the plurality of LEDs in the light fixture as light sensors, wherein each LED of the plurality of LEDs acquires a different reference light output measurement.

In some embodiments, the method includes determining a calibration value for each LED in the LED light fixture by comparing the reference light output measurement of each LED to a reference value. In some embodiments, the method includes storing each LED's calibration value in a memory associated with the LED light fixture. In some embodiments, by application of the calibration value to the operation of the LED light fixture, the LED light fixture will sense light having properties associated with the reference value.

In some embodiments, measuring the reference light output from the light source includes measuring the reference light output using the plurality of LEDs in the light fixture as light sensors, wherein the plurality of LEDs is configured as a string of LEDS to acquire the light output measurement.

Another implementation is an LED light fixture calibration system that includes a light source to generate a reference light output. The system also includes a calibration module coupled to the light source and an LED light fixture, wherein the calibration module measures the reference light output from the light source by using at least one LED in the light fixture as a light sensor and, wherein the calibration module determines a calibration value by comparing the reference light output measurement to a reference value, such that by application of the calibration value to the operation of the LED light fixture, the LED light fixture will operate having properties associated with the reference value.

In some embodiments, the system includes a processor for storing the calibration value in a memory associated with the LED light fixture. In some embodiments, the system includes an enclosure in which the light source and LED light fixture are placed and, in the absence of ambient light, the light source generates the reference light output and the LED light fixture measures the reference light output.

In some embodiments, the LED light fixture has a plurality of LEDS and the LEDs measure the reference light output using the plurality of LEDs in the light fixture as light sensors, wherein each LED of the plurality of LEDs acquires a different reference light output measurement. In some embodiments, the calibration module determines a calibration value for each LED in the LED light fixture by comparing the reference light output measurement of each LED to a reference value. In some embodiments, the processor stores each LED's calibration value in a memory associated with the LED light fixture.

In some embodiments, by application of the calibration value to the operation of the LED light fixture, the LED light fixture will sense light having properties associated with the reference value. In some embodiments, measuring the reference light output from the light source includes measuring the reference light output using the plurality of LEDs in the light fixture as light sensors, wherein the plurality of LEDs is configured as a string of LEDS to acquire the light output measurement.

The lighting systems described relate broadly to installation, calibration, operation, measurement of lighting fixtures. Some embodiments include the use of LED's as light sources and as light sensors. The light fixture control systems described herein (herein referred to as "technology") can provide one or more of the following advantages. One advantage of the technology is that light sensors (including LEDs in a light fixture) can accurately measure ambient light levels at the install/operational site because the light fixtures at the site are synchronized so the fixtures are in an off-state at the same time. Another advantage of the technology is that light fixtures can be grouped and/or regrouped to vary or optimize system efficiency by accounting for varying ambient light levels in proximity to the light fixtures. Another advantage of the technology is that light fixture systems can be operated more efficiently by employing calibration (e.g., manual or automatic) techniques that account for variations in the performance characteristics of the light fixtures (e.g., due to manufacturing, system configuration, aging). Another advantage of the technology is that it solves a problem of having to have separate ambient light sensors in your lighting system, or having to have separate modules on your fixture. This gives you the same amount of performance and flexibility without any of the added cost or complexity.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Ambient light sensors may be used to save energy, and dim lighting systems to a lower light level when ample ambient light is present in a particular space. The challenges with any ambient light sensor in a lighting environment, whether it be an office, classroom, or atrium, is that an ambient light sensor not only picks up ambient light (i.e., natural light), but also any light contributed by any active light fixture or light source in proximity to the ambient light sensor. In some embodiments it is desirable to synchronize the operation of light fixtures (or separate controllable units inside a single light fixture) so that the light fixtures are all off at the same time. This allows for true, natural ambient light to be measured in the space.

An example of a typical conventional LED fixture install involves using daylight harvesting/ambient light sensors in a lighting system in a classroom setting. This lighting system would use linear or panel lighting as general illumination and also include 1 or 2 ambient light sensors in the room to measure the ambient light, and dim the fixtures as needed to a minimum level to maintain a certain candela distribution. The less ambient light available, the more intensity the light fixtures will produce to provide the necessary light levels. Problems with this type of system include:

Ambient light sensors need to be sourced, adding another component to the lighting plan, adding cost and integration understanding. Usually the sensor manufacturer is different than the light fixture manufacturer.

Determining where to locate the ambient light sensor can be difficult depending on the classroom layout and available natural light levels. This can prove troublesome during the installation process.

Compatibility of fixtures and ambient light sensors. Trying to guarantee compatibility of the two can be troublesome.

Figure 1:
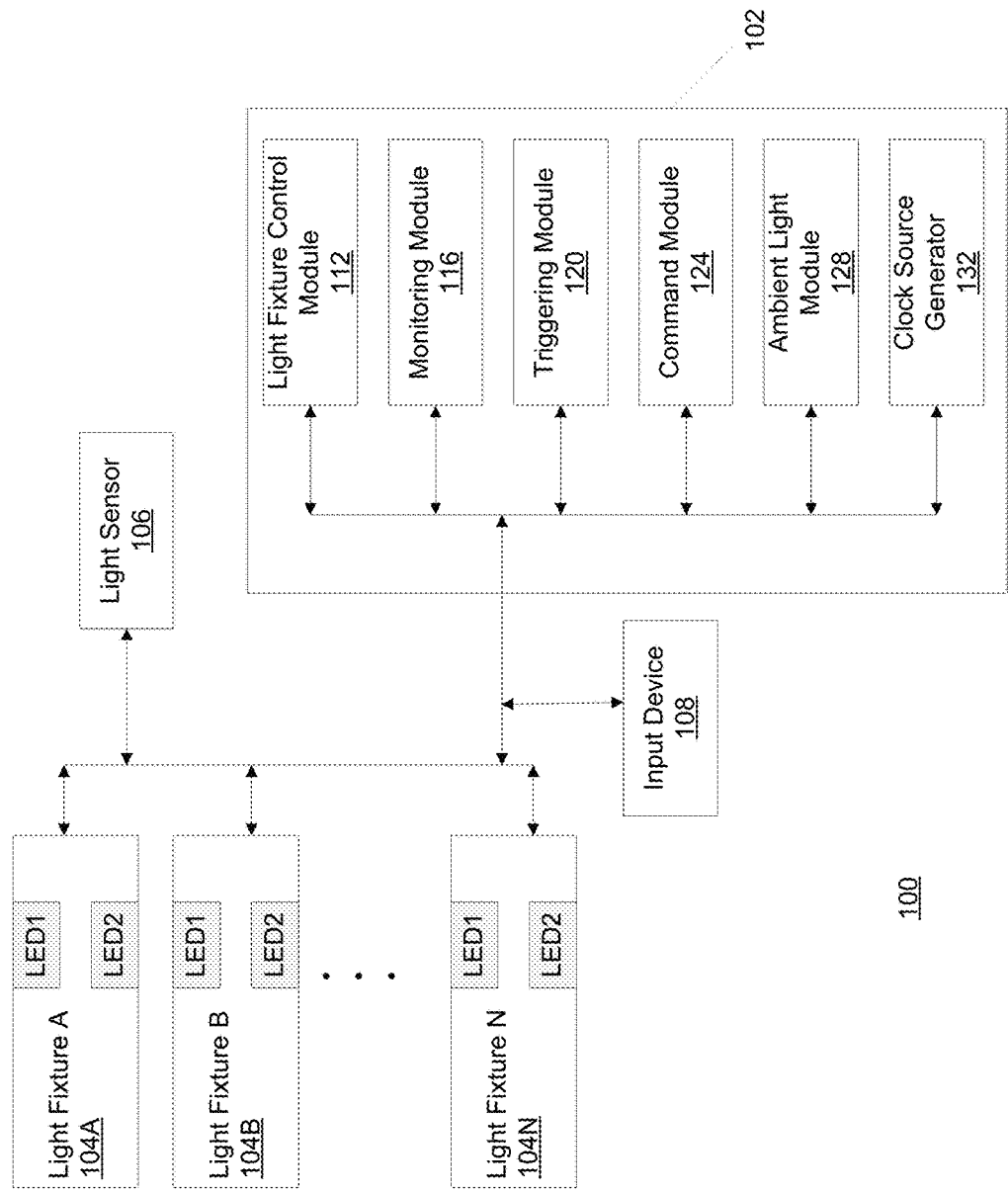
FIG. 1 is a block diagram of a light fixture control system for synchronizing a plurality of light fixtures and for measuring ambient light, according to an illustrative embodiment.

FIG. 1 is a block diagram of a lighting environment 100 of a light fixture control system 102 for synchronizing a plurality of light fixtures 104A, 104B . . . 104N (generally 104) and for measuring ambient light, according to an illustrative embodiment. The environment 100 also includes a light sensor 106 that measures light (e.g., ambient light) in the proximity of the light fixtures 104. Exemplary light sensors that can be used include, for example, model LX1972A and model LX1973B light sensors sold by Microsemi Corporation (Aliso Viejo, Calif.), model TSL4531 digital ambient light sensor sold by ams AG (Austria), the ADC family of light sensors sold by Sensor Switch, Inc. (Wallingford, Conn.), and the FS-155 and FS-155-1 model occupancy sensors sold by WattStopper (Santa Clara, Calif.). In some embodiments, a separate light sensor device (e.g., one of the Microsemi or ams light sensors) is not used to make ambient light measurements. Rather, one or more LEDs in an LED light fixture of the system are used. As described further herein (e.g., with respect to FIG. 6A), the LEDs of a light fixture can be used as photodiodes because they are sensitive to incoming electromagnetic energy to which they are exposed.

Each light fixture 104 includes two LED lights (LED1 and LED2). The LED lights can be the same LED type or different LED types. For example, in one embodiment, LED1 is a white LED with a 2700K color temperature and LED2 is a white LED with a 6000K color temperature. Alternative numbers, types (e.g., color, color temperature), and different combinations of LEDs can be used in alternative embodiments.

In operation, an input device 108 (e.g., a dimmer) connected to the light fixture control system 102 is used by an operator to control the output of the light fixtures 104. In this embodiment, the output of device 108 specifies what color temperature of light within the range of 2700K to 6000K the user wants the light fixtures 104 to output. Table 1 provides exemplary values for the output voltage of the device 108. The system 102 also includes a light fixture control module 112 that outputs a PWM signal to control the light fixtures 104 based on the output of device 108. Table 1 also lists the PWM signal that the light fixture control module 112 outputs, and the color temperature that the light fixtures 104 output based on the PWM signal. One skilled in the art will appreciate that intermediate voltage levels (e.g., voltage between 1.0 and 4.5 volts) will produce light having a color temperature between 2700 K and 4350 K).

TABLE 1

Exemplary values for light fixture operation

| Dimmer voltage output | Light fixture control module (PWM duty cycle command) to two different LED types | Light output color temperature |
| --- | --- | --- |
| 0.0 volts | LED1 (0% duty cycle) LED2 (0% duty cycle) | No light |
| 1.0 volts | LED1 (100% duty cycle) LED2 (0% duty cycle) | 2700 K |
| 4.5 volts | LED1 (50% duty cycle) LED2 (50% duty cycle) | 4350 K |
| 10.0 volts | LED1 (0% duty cycle) LED2 (100% duty cycle) | 6000 K |

Figure 2:
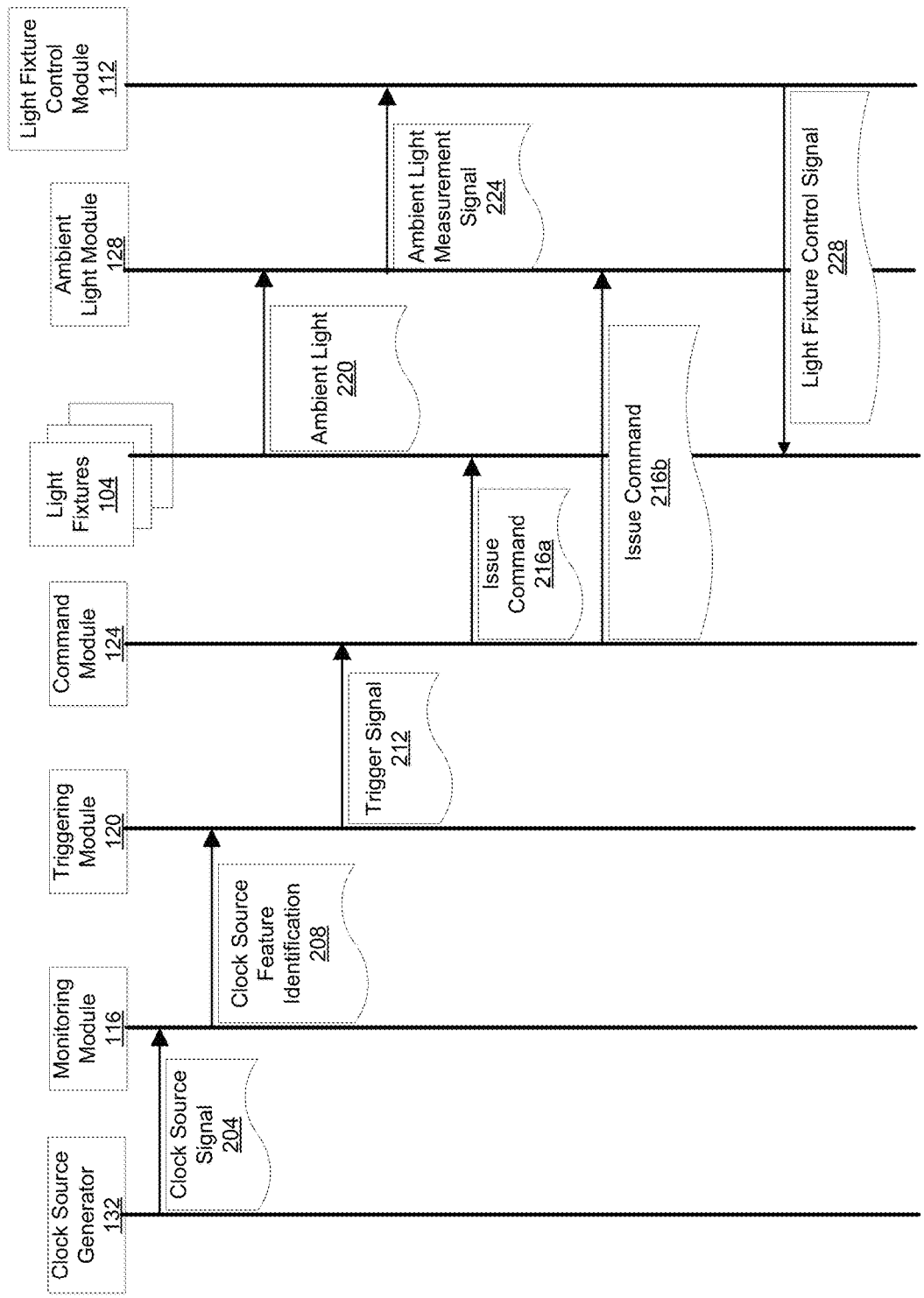
FIG. 2 is a diagram of a process for controlling light fixtures, according to an illustrative embodiment.

The light fixture control system 102 also includes a monitoring module 116, a triggering module 120, a command module 124, an ambient light module 128, and a clock source generator 132. FIG. 2 is a diagram 200 of a process for controlling light fixtures, for example, the light fixtures 104 of FIG. 1. The clock source generator 132 generates a clock source signal (step 204) that is used by the system 102 to synchronize the light fixtures 104. The monitoring module 116 monitors the clock source signal to identify (step 208) the presence of a feature in the clock source signal (as described, for example, below).

The triggering module 120 generates a trigger signal (step 212) in response to identifying the presence of the feature in the clock source signal. The command module 124 provides the trigger signal (step 216a) to each of the light fixtures 104 to command each of the light fixtures 104 to stop outputting light. The command module 124 also provides the trigger signal (step 216b) to the ambient light module 128. The ambient light module 128 measures the ambient light (step 220), in response to the trigger signal, using for example, the light sensor 106 of FIG. 1. The ambient light module 128 then outputs an ambient light measurement signal (step 224) to the light fixture control module 112.

In some embodiments, the light fixture control module 112 varies operating parameters of one or more of the light fixtures 104 based on the measured ambient light. In some embodiments, the light fixture control module 112 decreases the illumination intensity of one or more of the light fixtures 104 when the measured ambient light is relatively high (e.g., mid-day when light from the sun entering the space is relatively strong in the vicinity of the light fixtures). The light fixture control module 112 may vary operating parameters based on expected changes to the ambient light. For example, the system might decrease illumination levels at night when it is typical that people will not be in the lighting environment. Another example is that it might be desirable to change the color temperature of the fixtures depending on the ambient light levels throughout the day. Depending on the ambient light throughout the day, it might be desirable to change color temperature to change moods, or mimic and follow the natural color temperature tendencies of daylight.

Other scenarios are calendar and time clock based, where certain light levels are maintained at certain times of day and altered accordingly. An example of this is in an office building setting. The office building may lower light levels and power usage at 5:30 PM when the building becomes unoccupied. But, the building has a time-stamped control module that will increase light levels at say 9 PM-10 PM, when the cleaning crews are occupying the space. Another example is meeting spaces in a building. Using a time-stamped control module that is integrated to a computer calendaring system, fixtures in meeting rooms could turn on and off based on occupancy, but also whether the rooms are reserved or not for meetings. Occupancy sensing and control is another example. An additional example would be classroom and meeting room control of lighting based on projector or TV use. Different light sensors can measure the ambient light and automatically control fixtures depending if a projector is used (e.g., keep lights on at the back of the room, but dim the front).

Figure 3:
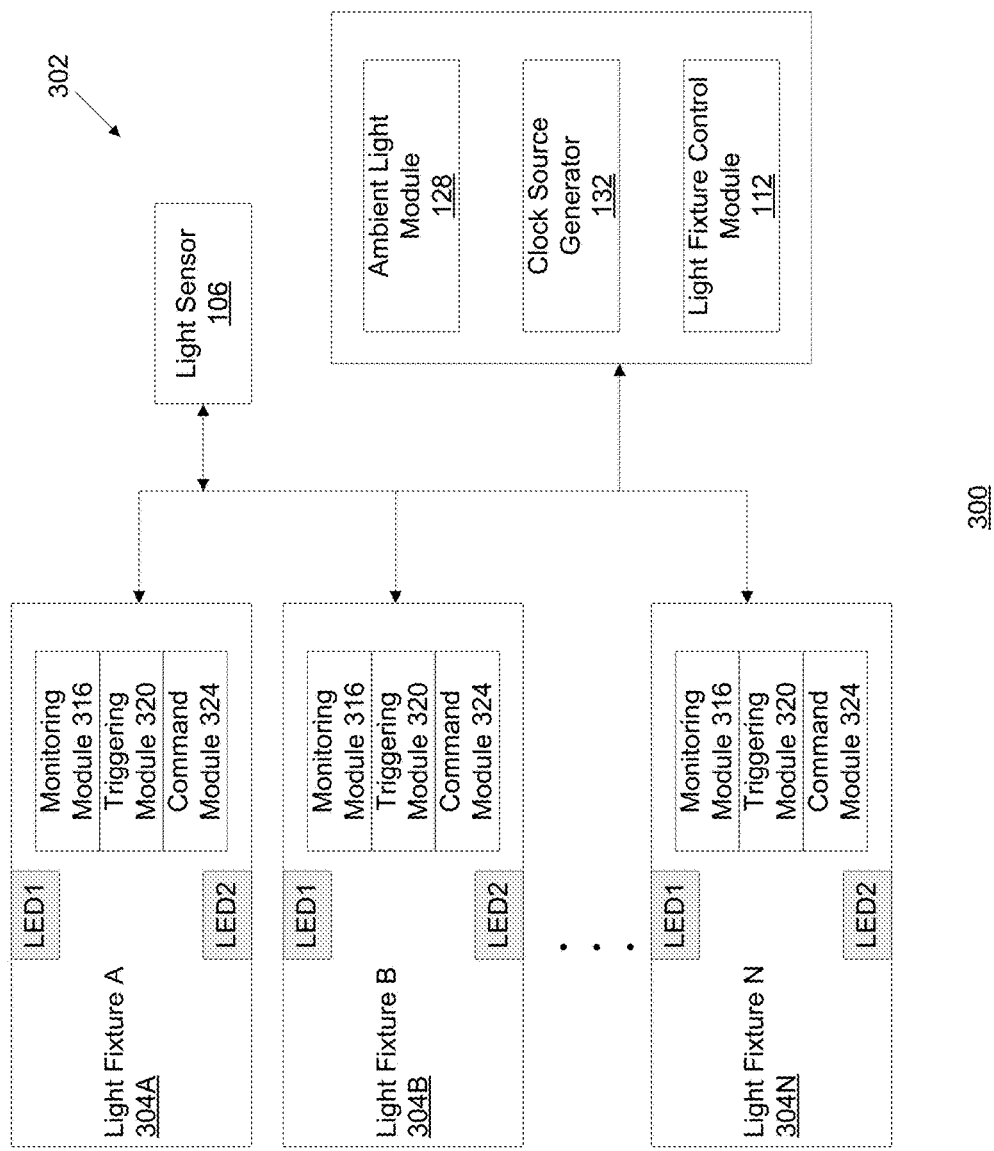
FIG. 3 is a block diagram of a light fixture control system for synchronizing a plurality of light fixtures and for measuring ambient light, according to another illustrative embodiment.

FIG. 3 is a block diagram of another lighting environment 300 of a light fixture control system 302 for synchronizing a plurality of light fixtures 304A, 304B . . . 304N (generally 304) and for measuring ambient light. The environment 300 also includes a light sensor 106 that measures light (e.g., ambient light) in the proximity of the light fixtures 304. The light fixture control system 302 includes light fixture control module 112, ambient light module 128, and clock source generator 132 (e.g., the same modules as used in FIG. 1). In this embodiment, as opposed to the embodiment of FIG. 1, each of the light fixtures 304 includes a monitoring module 316, triggering module 320, and command module 324. Each of the modules (316, 320, and 324) performs the same function as the same-named modules 116, 120, and 124 of FIG. 1; however, the functions are performed within (or part of) each light fixture in the embodiment illustrated in FIG. 3.

Figure 4A:
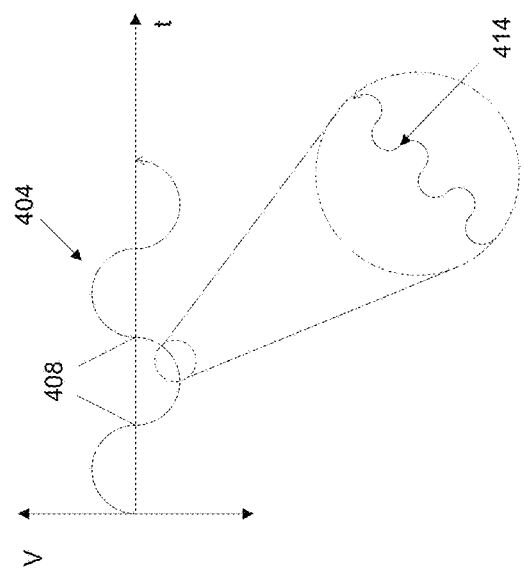
FIG. 4A is a graphical representation of a waveform used as a clock source signal for commanding light fixtures to stop outputting light, according to an illustrative embodiment.

FIG. 4A is a graphical representation of an AC signal waveform 404 used as a clock source signal for commanding light fixtures to stop outputting light. The AC signal waveform could supply power to the light fixture and also includes a sine wave 414 that rides the sine wave of the AC signal waveform 404. In one embodiment, a monitoring module (e.g., monitoring module 116 of FIG. 1) monitors the waveform 404. When the monitoring module 116 identifies the presence of a zero-crossing 408 feature in the waveform, the triggering module 120 generates a trigger signal. The trigger signal is provided to the command module 124. The command module provides the trigger signal to the light fixtures 104 to command the fixtures to enter a state in which the light fixtures 104 stop outputting light. In some embodiments, the command module 124 commands the light fixtures 104 to stop outputting light for a predefined time period (e.g., 1 ms, 5 ms, 10 ms, 1% of the duty cycle of the signal used to provide power to the light fixtures). In some embodiments, the waveform 404 also provides power to the plurality of light fixtures 104 to cause the fixtures to illuminate.

Figure 4B:
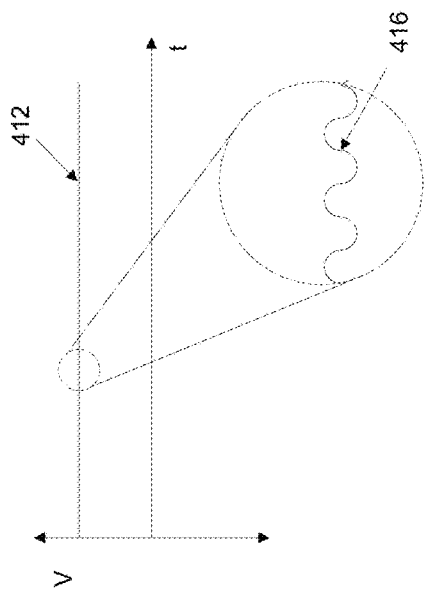
FIG. 4B is a graphical representation of a waveform used to provide power to light fixtures and used as a clock source signal, according to an illustrative embodiment.

FIG. 4B is a graphical representation of a DC signal waveform 412 used to provide power to the plurality of light fixtures 104 and used as a clock source signal. In this embodiment, a power line communication signal 416 is carried by the DC signal 412. The power line communication signal 416 also acts as the clock source signal. When the monitoring module 116 identifies a particular pre-defined feature in the power line communication signal 416 (e.g., a particular encoded frequency), the triggering module 120 responds to the identification of the feature by generating the trigger signal. The trigger signal is used by the system to command the light fixtures 104 to stop outputting light and to command the ambient light module 124 to measure ambient light in proximity to the light fixtures 104.

One way to sync up fixtures involves doing so with the fixtures all being in an off state at the same time. The microprocessor reads the ambient light when the fixture is off. One of the challenges is that while that particular fixture is off, other surrounding fixtures will most likely being in the "on" state (or "off" state), as the microprocessors that are on each individual fixture have no way of syncing their PWMs to know that they will always be "off" at the same time. To make this invention better, we can use power line communication, and the 50-60 Hz signal that goes along with it, as a way to sync up all the fixtures on the power line communication network to ensure their PWMs are in sync. By syncing up all of the fixtures on a network, when a fixture reads the ambient light coming from the LEDs in the off state, it is the true ambient light measured because all fixtures will be off and not emitting light when the measurement is made. The method involves using the zero cross signal of the AC line supplied to the light fixtures as the synchronizing signal for aligning the PWM signals for the fixtures.

Another implementation involves using the powerline communication as a clock source to sync the fixtures together. Powerline communication systems, often called powerline carrier communication systems, involve methods that enable systems to carry data on a conductor that is also used for electric power transmission, such as a conventional 117 volt AC line, a 230 volt AC line (such as used in Europe), a 100 volt AC line (such as used in Japan), a 277 volt AC line (such as used in certain commercial applications in the United States) or a 347 volt AC line (such as used in certain commercial applications in the Canada). There are many different ways to communicate on a powerline, but ultimately all communication is done by impressing a modulated carrier signal onto the system power conductors together with the 117 volt AC power signal and separating the power signal and the communications signals at a receiving point.

In one embodiment, a powerline communication control unit is used with the technology described herein and includes a master controller that includes a lighting control command processor for receiving a lighting unit control input from a lighting controller and generating corresponding lighting unit command outputs in a lighting system command format and a power distribution system interface connected to a power distribution system for superimposing the lighting unit command outputs onto the power distribution system and a power signal present thereon as a lighting command signal according to a lighting unit command transmission mode. This powerline communication technology is implemented according to a modulation selected from the group consisting of: amplitude modulation; frequency modulation; phase modulation; binary phase shift keying modulation; quadrature phase shift keying modulation; quadrature amplitude modulation; frequency shift keying modulation; phase shift keying modulation; and combinations thereof. Additional detail regarding power line communication systems and methods that can be used with the technology in this disclosure are provided in Appendix A (attached here and incorporated by reference in its entirety).

Implementation of powerline communication techniques enables the system to make sure the clock signal is used to set the operation of the fixtures to have their PWM signal in the off state at the same time. This enables the system to measure the ambient light in that fixture space as true ambient light because all the light fixtures are commanded to be off at the same time. One of the advantages to this method is it can be much faster than if the zero cross detection method was used. A programmable logic controller (PLC) in the light fixture system can transmit under normal operations at between 100 kHz-150 kHz. This is much faster than a 50 or 60 Hz signal corresponding to the zero cross detection of the AC supply.

Figure 5A:
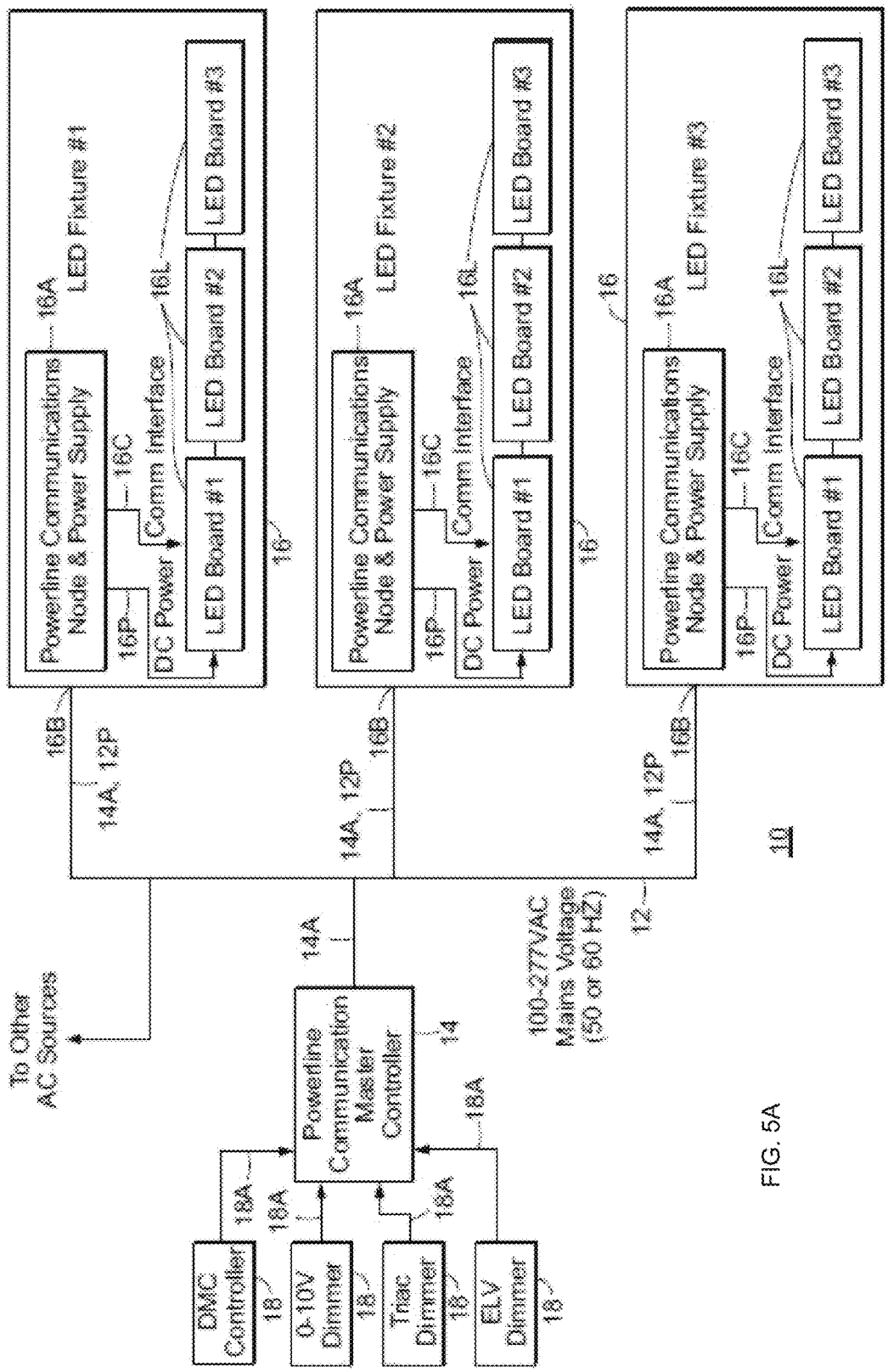
FIG. 5A is a functional block diagram of an embodiment of a powerline communication control system for LED lighting fixtures, according to an illustrative embodiment.

Referring to FIG. 5A, a block diagram of a powerline communication control system 10 for LED lighting fixtures is shown therein. As illustrated, a powerline communication control system 10 of the present invention includes a conventional power distribution system 12, such as a 117 volt AC network, at least one master controller 14 and one or more LED fixture slave units 16 (three of which are diagrammatically shown in FIG. 5A but it is to be appreciated that the amount of the slave units 16 can vary depending upon the particular application). The control output 14A, from each master controller 14, is connected via the power distribution system 12, so as supply a separate control input to at least one, and more preferably a plurality, of the slave unit 16

Referring first to an exemplary master controller 14 is coupled to one or more conventional dimmer controllers 18 (four of which are diagrammatically shown in FIG. 5A but it is to be appreciated that the amount of the dimmer controllers 18 can vary depending upon the particular application). Each master controller 14 receives one or more dimmer control inputs 18A from one or more of the conventional dimmer controllers 18. It is to be appreciated that the dimmer controller 18 may include, for example, a Digital Multiplex (DMX) controller(s), a 0-10V Dimmer(s), a TRIAC dimmer(s) or an Electronic Low Voltage (ELV) Dimmer(s) and the dimmer control inputs 18A are conventional, standard output control signals of the corresponding types of dimmer controllers 18. More generally, any conventional electrical controller can be accommodated by providing a suitable interface for obtaining a controller setting. Other controllers include current loop controllers as commonly used in the industrial process control of instruments. One such class of controllers is known as 4-20 mA controllers.

The master controller 14, upon receipt of the dimmer control inputs 18A, first converts the conventional, standard control input or inputs 18A from the one or more master controllers 18 into corresponding powerline control signals 14A. Next, the master controller 14 imposes the powerline control signals 14A onto the wiring of the power distribution system 12, together with the conventional power signal 12P present on power distribution system 12, and also transmits the powerline control signals 14A through the power distribution system 12 to each one of the slave units 16. In a presently preferred embodiment of the present invention, the powerline control signals 14A may be, for example, in the form of a frequency shift keyed signal (FSK), a differential frequency signal (DFSK) or a differential phase shift keyed signal (DPSK). The command code format of the powerline control signals 14A may, for example, be that of a commercially available controller format or a version thereof modified for the specific needs of a powerline communication control system 10 or may be designed specific for the powerline communication control system 10.

According to the present invention, the powerline control signal 14A may be in the form of broadcast commands to all of the slave units 16 connected with the power distribution system 12, so that all slave units 16 are controlled concurrently and in parallel with one another. Alternately, the powerline control signals 14A may be specifically addressed to an individual slave unit 16, or to groups of the slave units 16, thereby allowing individualized control of one or more of the slave units 16 of the powerline communication control system 10.

Next referring to an exemplary slave unit 16, as illustrated in FIG. 5A, the slave unit 16 includes one or more LED lighting units 16L (only three of which are diagrammatically shown in FIG. 5A but it is to be appreciated that the amount of the LED lighting units 16L can vary depending upon the particular application) and a communication and power supply node 16A. As indicated, each communication and power supply node 16A has a power and control input 16BA, 16BP which is connected with the power distribution system 12 in order to receive both the powerline control signals 14A and the power signal 12P from the power distribution system 12. As indicated in FIG. 5A, the communication and power supply node 16A, of each slave unit 16, initially separates the received powerline control signals 14A from the received power signal 12P, and then generates a DC power output 16P from the power signal 12P, and then supplies the generated DC power signal 16P to the lighting units 16L in order to power the lighting units 16L as controlled by the master controller 14. The communication and power supply node 16A, of each slave unit 16, also decodes the received powerline control signals 14A and, in turn, then generates corresponding lighting control commands 16C and subsequently supplies the control commands 16C to the lighting units 16L so as to control the operation of the lighting units 16L.

Figure 5B:
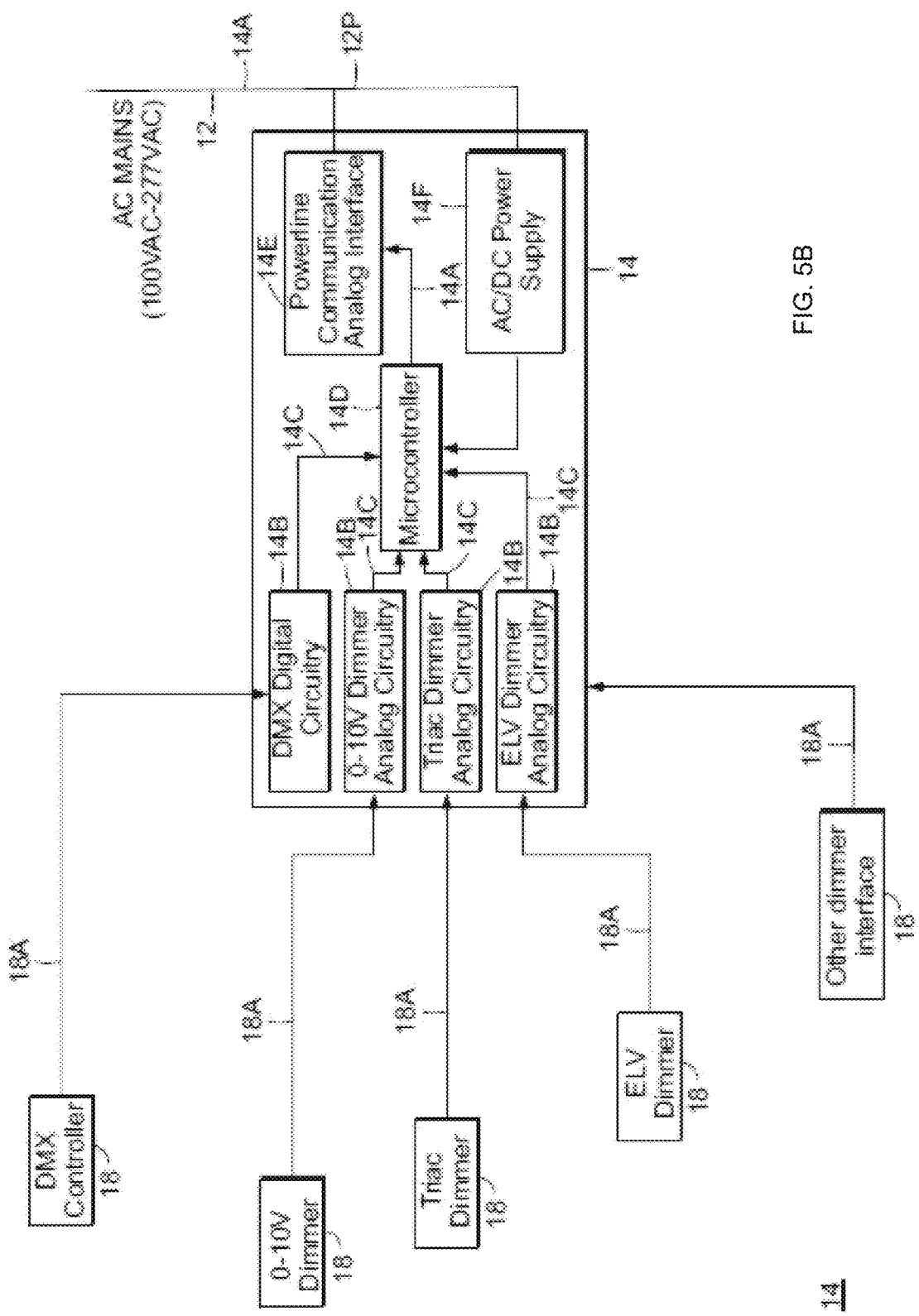
FIG. 5B is a functional block diagram of an embodiment of a master controller of a powerline communication control system for LED lighting fixtures, according to an illustrative embodiment.
Figure 5C:
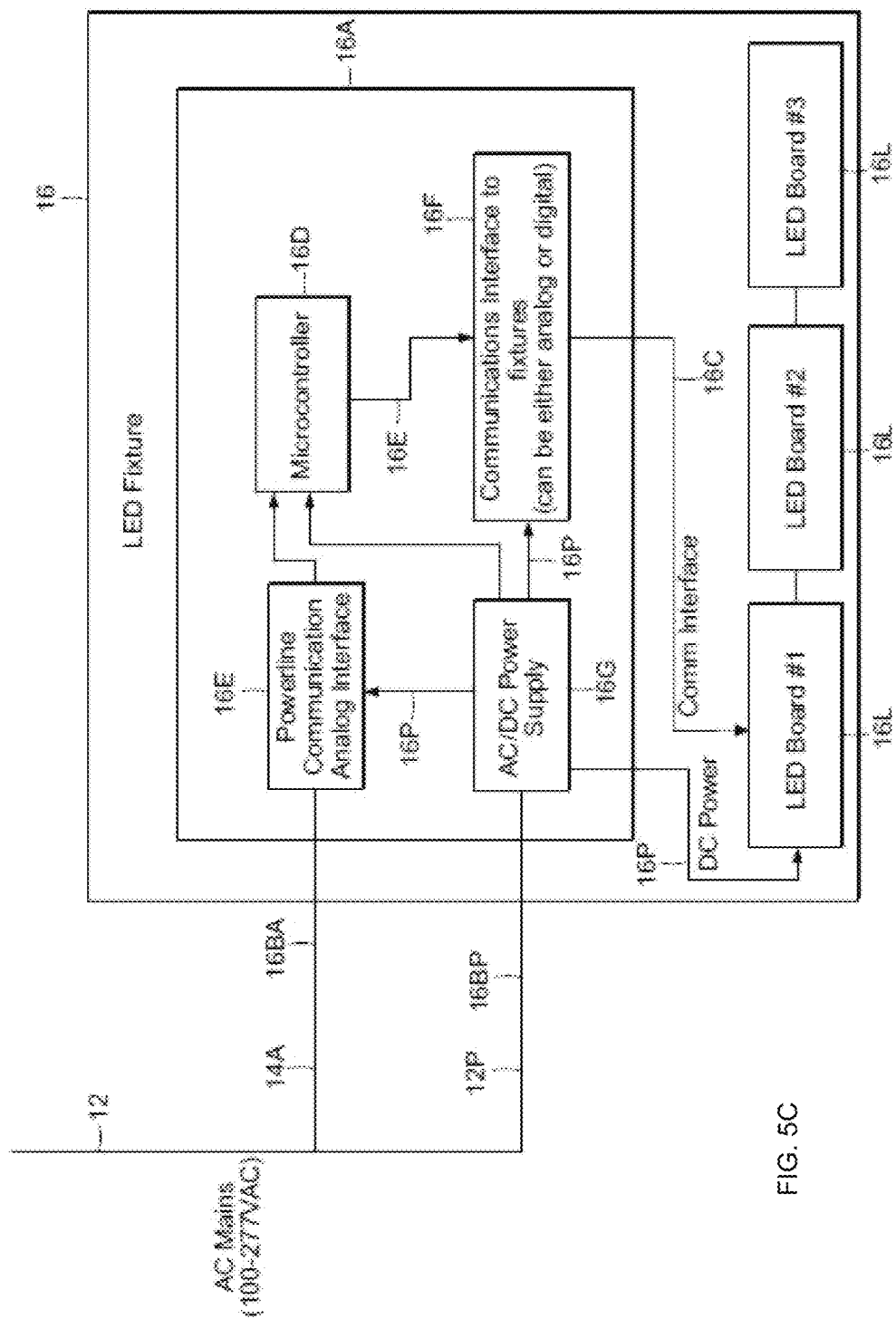
FIG. 5C is a functional block diagram of an embodiment of a slave LED lighting fixture unit of a powerline communication control system for LED lighting fixtures, according to an illustrative embodiment.

Referring next to FIGS. 5B and 5C, more detailed block diagrams of both the master controller 14 and the slave unit 16, according to the present invention, are respectively shown therein. As illustrated in FIG. 5A, each master controller 14 includes one or more dimmer control conversion circuits 14B for converting the control inputs 18A, from the corresponding dimmer controllers 18, into the corresponding dimmer command inputs 14C to a microprocessor 14D which, under control of at least one program(s) residing in a resident memory (not shown for purposes of clarity) to generate the corresponding powerline control signals 14A, which are then superimposed onto the wires of the power distribution system 12 and the power signal 12P present thereon by a powerline interface 14E for transmission of the slave units 16. As indicated, each master controller 14 will also include other necessary circuitry, such as a power supply 14F for receiving electrical power from the power distribution system 12.

Referring to FIG. 5C, the power and control input 16B of each communication and power supply node 16A of each slave unit 16 includes a control input 16BA, connected to the power distribution system 12 and to the input of a communication interface 16B which receives the powerline control signals 14A and the power signal 12P from the power distribution system 12, separates the powerline control signals 14A from the power signal 12P, and provides corresponding control signals 14A to an input of a slave control microprocessor 160. The slave control microprocessor 160, operating under control of at least one program(s) residing in a memory (not shown for purposes of clarity), in turn, decodes control signals 14A and generates corresponding slave control signals 16E, which are converted into corresponding analog or digital lighting control commands 16C, by a fixture interface 16F, and then communicated to each one of the lighting units 16L.

A power input 16BP is likewise connected to the power distribution system 12 to receive the power signal 12 with the superimposed powerline control signals 14A and is connected to the input of a power supply 16G which, in turn, generates DC power outputs 16P which are supplied to the circuits of the communication and power supply node 16A and eventually to the lighting units 16L of the slave unit 16.

Figure 6A:
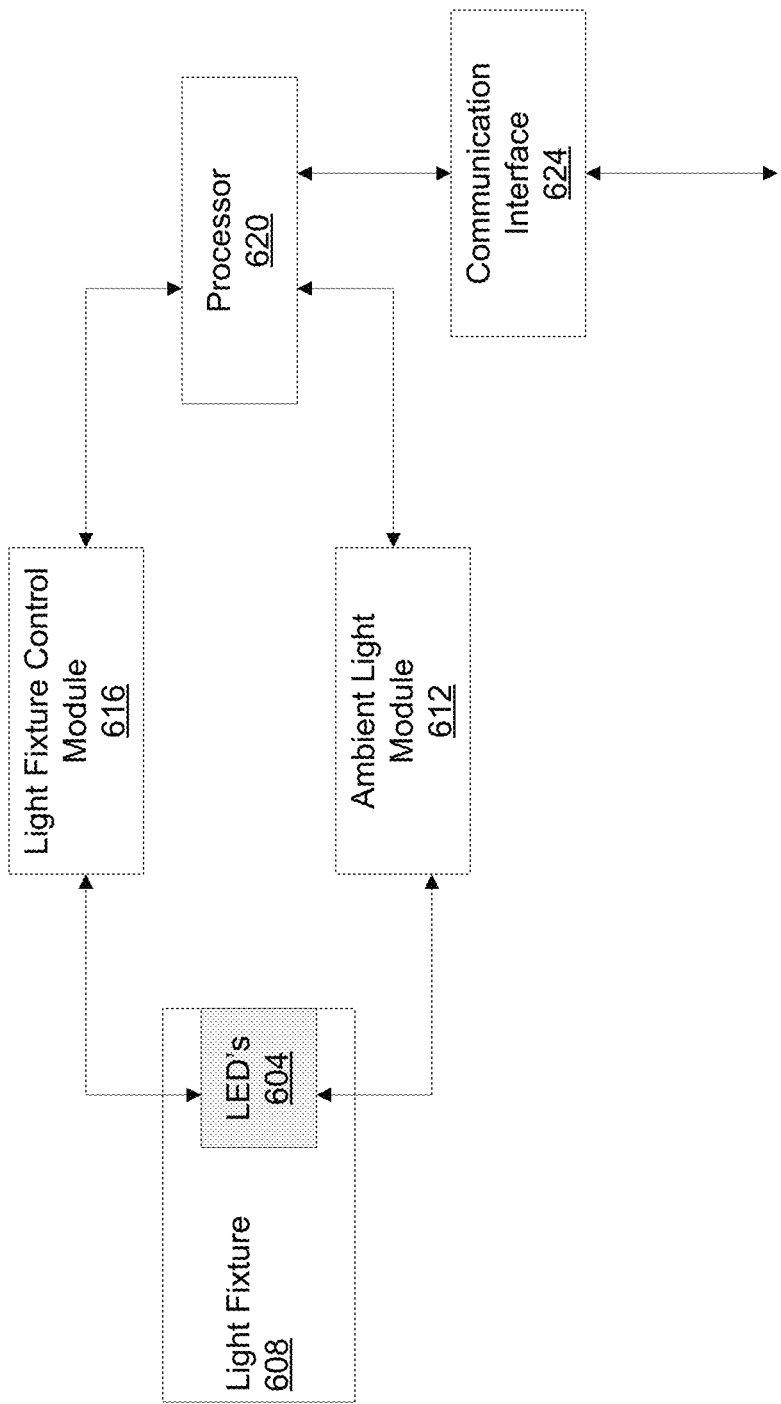
FIG. 6A is a block diagram of a portion of a lighting system, according to an illustrative embodiment.

FIG. 6A is a block diagram of a portion of a lighting system 600, according to an illustrative embodiment. In this embodiment, the LEDs 604 of the light fixture 608 are used for illumination as well as light sensors for measuring ambient light in the location of the light fixture 608. The lighting system 600 includes an ambient light module 612, a light fixture control module 616, a processor 620, and a communication interface 624. The communication interface 624 receives signals (e.g., commands, clock source signals, trigger signals) from a light fixture control system (e.g., light fixture control system 102 of FIG. 1).

The communication interface 624 conveys the signals to the processor 620. The processor 620 (e.g., a microprocessor) communicates with and provides commands to the ambient light module 612 and the light fixture control module 616. For example, in normal operation, the light fixture control module 616 turns on the light fixture 608 and provides a flow of current that travels through the LEDs 604 causing the LED 604 emitters to output light that is proportional to the current flow. LEDs have a set forward voltage (about 2.2V for red and amber LEDs, and about 3.0-3.3V for white, blue and green LEDs).

In this embodiment, the processor 620 provides a trigger signal to the ambient light module 612 and the light fixture control module 616 when a clock source signal (e.g., the clock source signal described with respect to FIG. 1) is identified. In response to the clock source signal, the processor 620 commands the light fixture control module 616 to command the light fixture 608 to place the LEDs 604 in an off state and therefore to stop outputting light and commands the ambient light module to measure ambient light using the LEDs 604 of the light fixture. When these LEDs are in the off state, it is possible to measure the voltage across the LEDs and correlate it to ambient light.

LED lighting fixtures typically contain 1 or more LED strings that are driven with some method of control to provide illumination. When LEDs are turned "on", there is a current travelling through the LED that has a set forward voltage (about 2.2V for red and amber LEDs, and about 3.0-3.3V for white, blue and green LEDs), illuminating light out of the emitter, proportional to the current flow. A common method for controlling LEDs is using Pulse Width Modulation (PWM). This is where you switch on and off the LEDs at a fixed period (frequency), and change the duty cycle of on time to correspond to the desired intensity of light emitted out of the LED.

LEDs are most commonly driven, using PWM (pulse width modulation). In this method, LEDs are digitally controlled via a square wave signal with a certain amount of on time (current being drawn thru the diode), and a certain amount of off time (no current flowing). When an LED fixture is being dimmed, the duty cycle will change such that the on time is less, and the off time more. From a human eyes standpoint, this is instantaneous, as the human eye cannot notice this on/off time, but the light source will appear dimmed to the human eye. Traditional fixtures in the same vicinity as an ambient light sensor can be either on or off when the ambient light sensor is taking its measurement. In the absence of synchronization, the ambient light measurements may not be a true representation of ambient light.

Figure 6B:
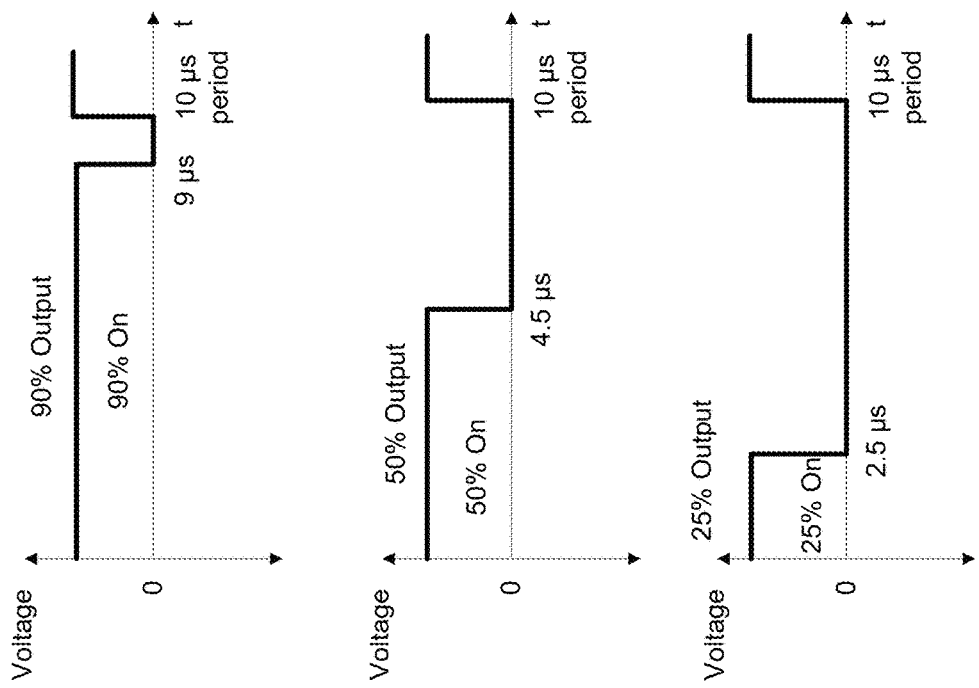
FIG. 6B is a schematic illustration of duty cycles used to operate an LED fixture, according to an illustrative embodiment.

FIG. 6B is a graphical representation of different on and off periods used for commanding the LEDs to be in the on-state and the off-state. In this example an arbitrary 10 us period is used as the fixed time for that particular LED control. This can and will be variable, depending on the implementation. As long as the frequency is fast enough the eye cannot detect the change from on to off or off to on. For a particular fixture the "on" time is displayed for 100%, 50% and 25% light output. In one embodiment, this is generally proportional to light intensity, except in this example 100% light output is 90% "on" as far as the duty cycle of the PWM. When a fixture is set to 25%, The LEDs are technically "off" 3 times as long as they are "on." A person's eyes cannot update fast enough to realize this so the cumulative effect makes the light fixture to appear to be dim, rather than off for part of the time. Ultimately LEDs act as ambient light sensors when they are in the off state, and they will produce a voltage across them proportional to the amount of light available. LEDs are typically in the off state for at least a certain amount of time, even when outputting "full" intensity.

Figure 6C:
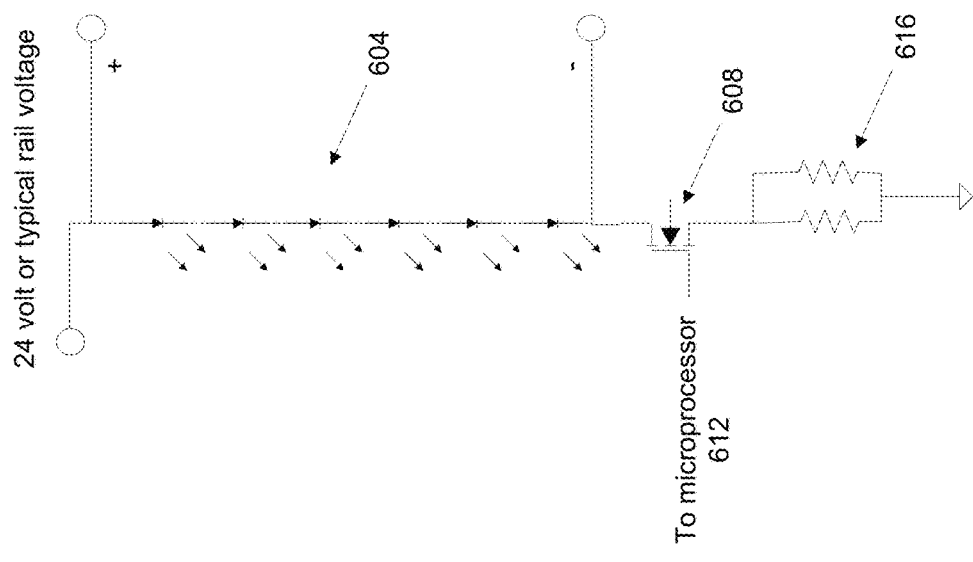
FIG. 6C a schematic illustration of a circuit used to measure voltage across a string of LEDs that are used as light sensors, according to an illustrative embodiment.

FIG. 6C is a schematic illustration of an LED string 604 in an exemplary system and how it is controlled by a switch (MOSFET) 608, via microprocessor control 612. The current setting resistors 616 at the bottom of FIG. 6C are used to set the current for the LED string. Measuring the voltage across the 6 LEDs when in the ON state, the voltage will be a function of the sum of all the forward voltages of the LEDs in the string 604. For 6 White LEDs, this will be about 20V (3.3×6). In the off state (MOSFET 608 is switched off) this voltage will vary depending on the amount of natural light the LEDs see, which could be, for example, between 0-2V. This voltage will vary depending on the number of LEDs in the string 604 however, as it is the stack up, similar to the total forward voltage when on.

Figure 6D:
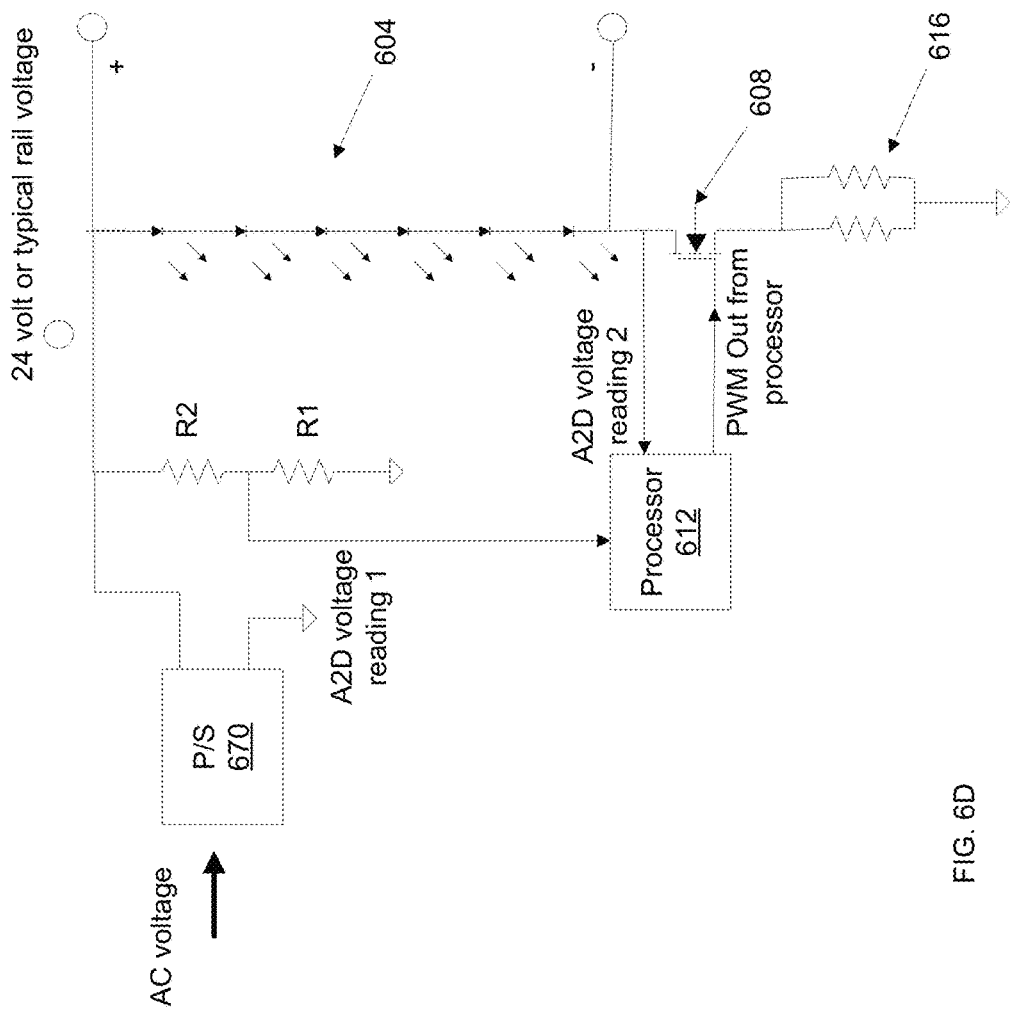
FIG. 6D is a schematic illustration of a circuit used to measure voltage across a string of LEDs that are used as light sensors, according to an illustrative embodiment.

FIG. 6D shows a block diagram of one implementation capable of reading this voltage (in the on or off state) with a microprocessor. The implementation involves reading the voltage of the rail (top of the LED string) and node between the last LED and the MOSFET (bottom of the LED string) with respect to ground, and computing the difference. The LED string voltage is equal to the difference between the A2D voltage reading 1 and A2D voltage reading 2. The rail voltage is resistor divided down to voltage read by the processor 612, but correlates to the rail voltage. Block 670 is an AC/DC power supply. It will take a known AC Voltage (e.g., 100V, 120V, 240V 277V) and convert it to a DC voltage rail (e.g., +24 VDC, +15 VDC, +12 VDC) to drive the LEDs and associated control circuitry.

Figure 6E:
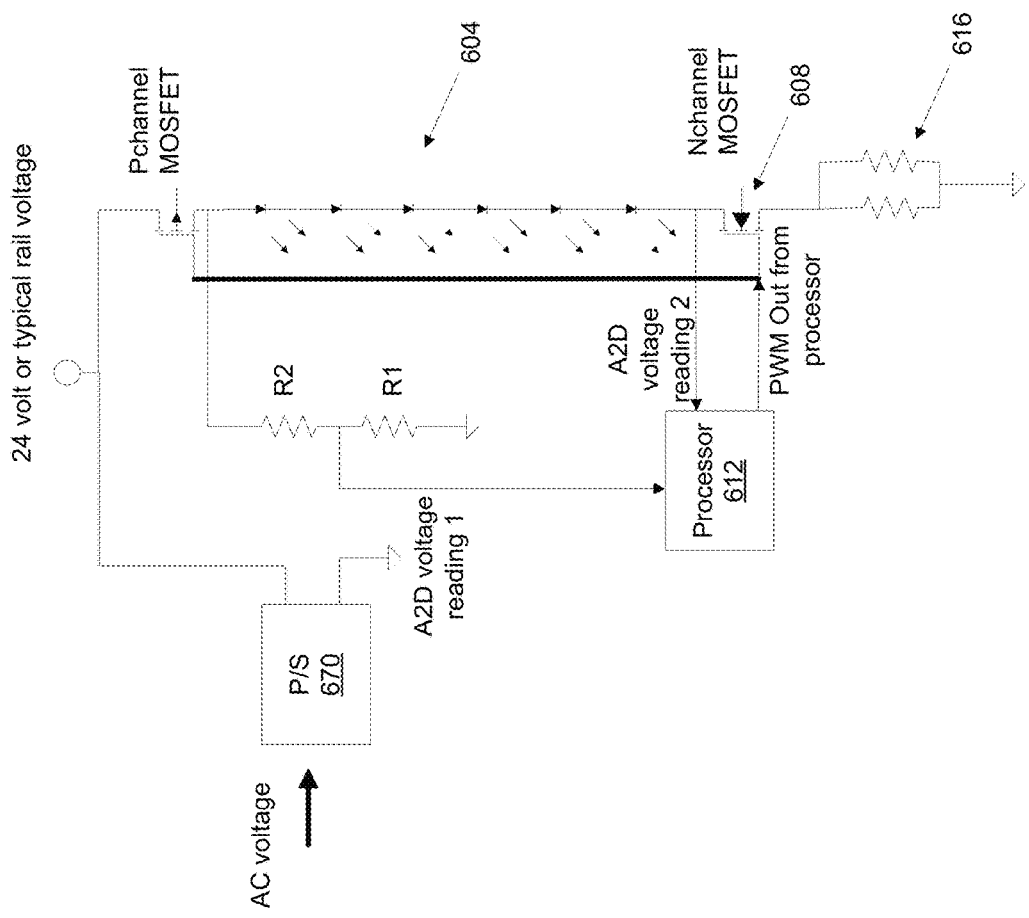
FIG. 6E is a schematic illustration of another circuit used to measure voltage across a string of LEDs that are used as light sensors, according to an illustrative embodiment.

FIG. 6E illustrates a block diagram of an alternate embodiment that enables the system to read the LED voltage. The embodiment in FIG. 6D uses a second MOSFET (the Pchannel MOSFET in this instance) to turn off the rail voltage (24V) at the top of the LED string to completely isolate the LED string while ambient light measurements are made using the LED string.

Figure 7:
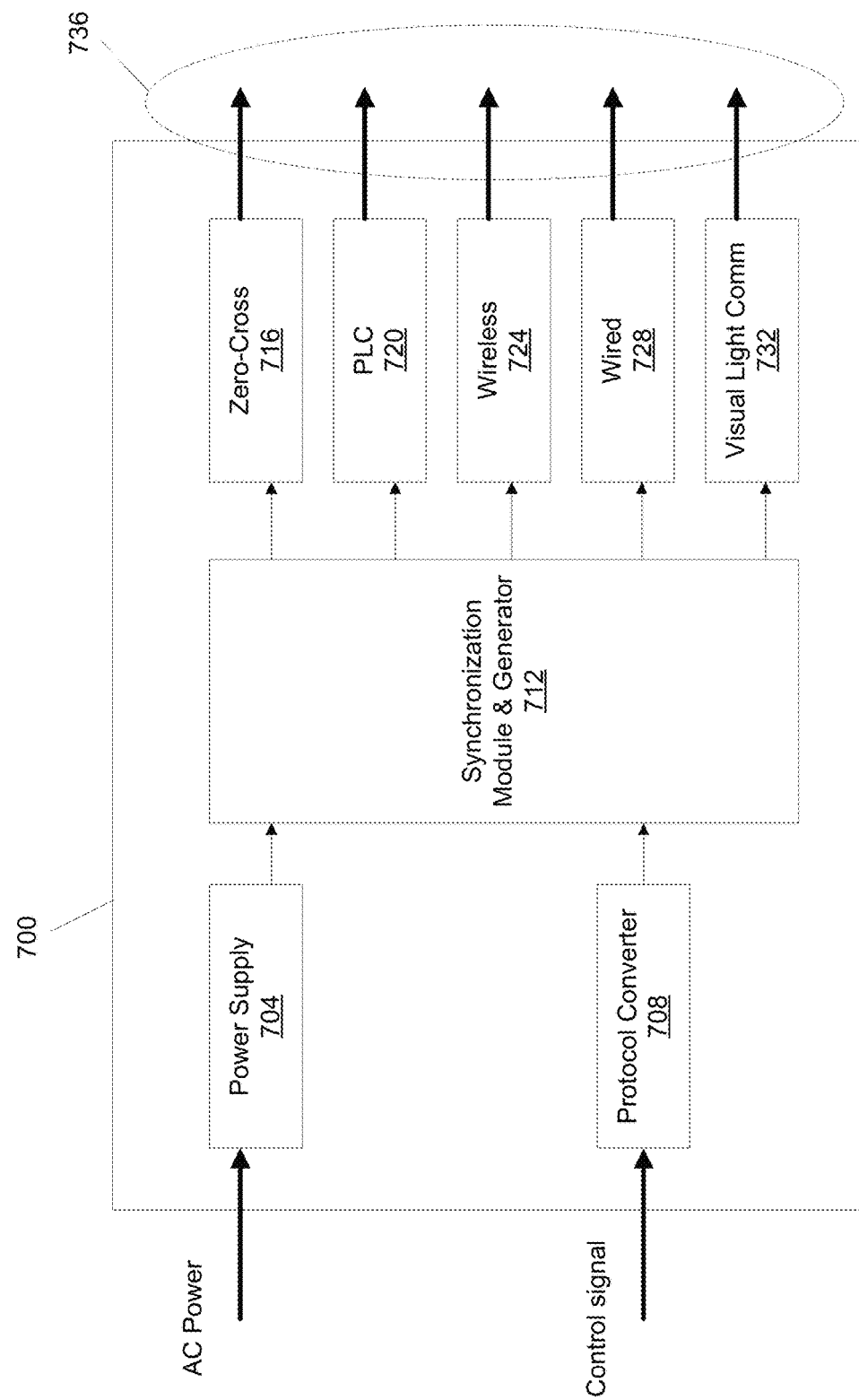
FIG. 7 is a block diagram of a clock source generator, according to an illustrative embodiment.

FIG. 7 is a block diagram of a clock source generator 700, according to an illustrative embodiment. The generator 700 is configured to generate a clock source signal that is used by a lighting system to synchronize light fixtures in the system (e.g., the fixtures of FIGS. 1 and 3). In this embodiment, the generator 700 is configured to generate and output a clock source signal 736 that can take the form of any one of five different protocols: zero-cross, power line communication, wireless, wired, and visual light communication. The power supply 704 of the generator 700 receives AC power, and the power supply 704 provides power to the modules of the generator 700. The generator 700 also includes a protocol converter 708 that converts an incoming control signal to a signal the synchronization module and generator 712 uses. A protocol converter 708 could be a simple bridge between any one of the outputs (716, 720, 724, etc,) as an input control signal (into 708). It could also be something different, like a building automation protocol like, for example, BacNet (a data communication protocol for building automation and control networks), or LonWorks (networking platform created to address the needs of control applications for, for example, lighting and HVAC).

The synchronization module and generator 712 generates the clock source signal based on the control signal received from the protocol converter 708. The clock source signal will be of the form needed for the particular lighting system being used. For example, in some embodiments, the lighting system is configured such that zero-cross synchronization is used, and therefore the synchronization module and generator 712 would output a zero-cross signal to a zero-cross module 716. The zero-cross module 716 would then output a clock source signal 736 in a zero-cross format. The clock source signal 736 is provided to synchronize the light fixtures (e.g., light fixtures 104 of FIG. 1), and as described herein with respect to, for example, the lighting system of FIG. 1.

The clock source generator 700 also includes a PLC module 720, wireless module 724, a wired module 728, and a visual light communication module 732. The PLC module 720 outputs a clock source signal 736 in a PLC format. The wireless module 724 outputs a clock source signal 736 in a wireless format. The wired module 728 outputs a clock source signal 736 in a wired format. The visual light communication module 732 outputs a clock source signal 736 in a visual light communication format.

Visual light communication (VLC) can be performed using, for example, a camera flash (e.g., a smart phone camera flash, or dedicated flash or light source). VLC is a way of using the frequency spectrum that LEDs are controlled by, to use the light output from a fixture as a means to communication. This allows a smart phone to easily communicate with LED lighting fixtures using VLC, without the need to use Wifi or other mesh networking. In one implementation, the LED flash on a smart phone is equipped with internal circuitry in the phone to be able to use the LED as a sensor and emitter for communication. In another implementation the screen of the device is used to produce images on the LCD display to mimic the operation of the camera flash. In another implementation, a dedicated light source in the lighting system is used to output the clock source signal 736.

Figure 8A:
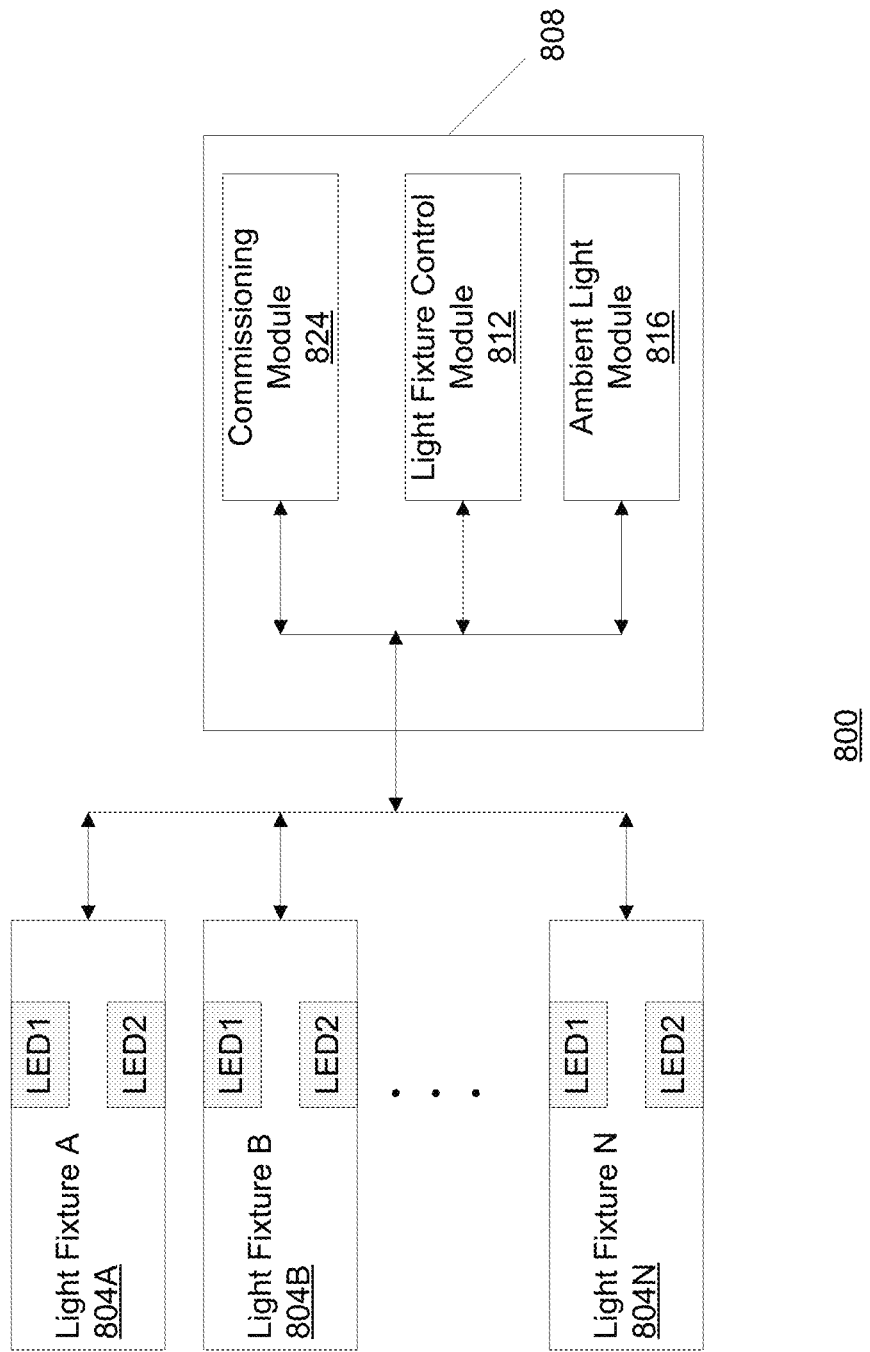
FIG. 8A is block diagram of a lighting system commissioning system, according to an illustrative embodiment.
Figure 8B:
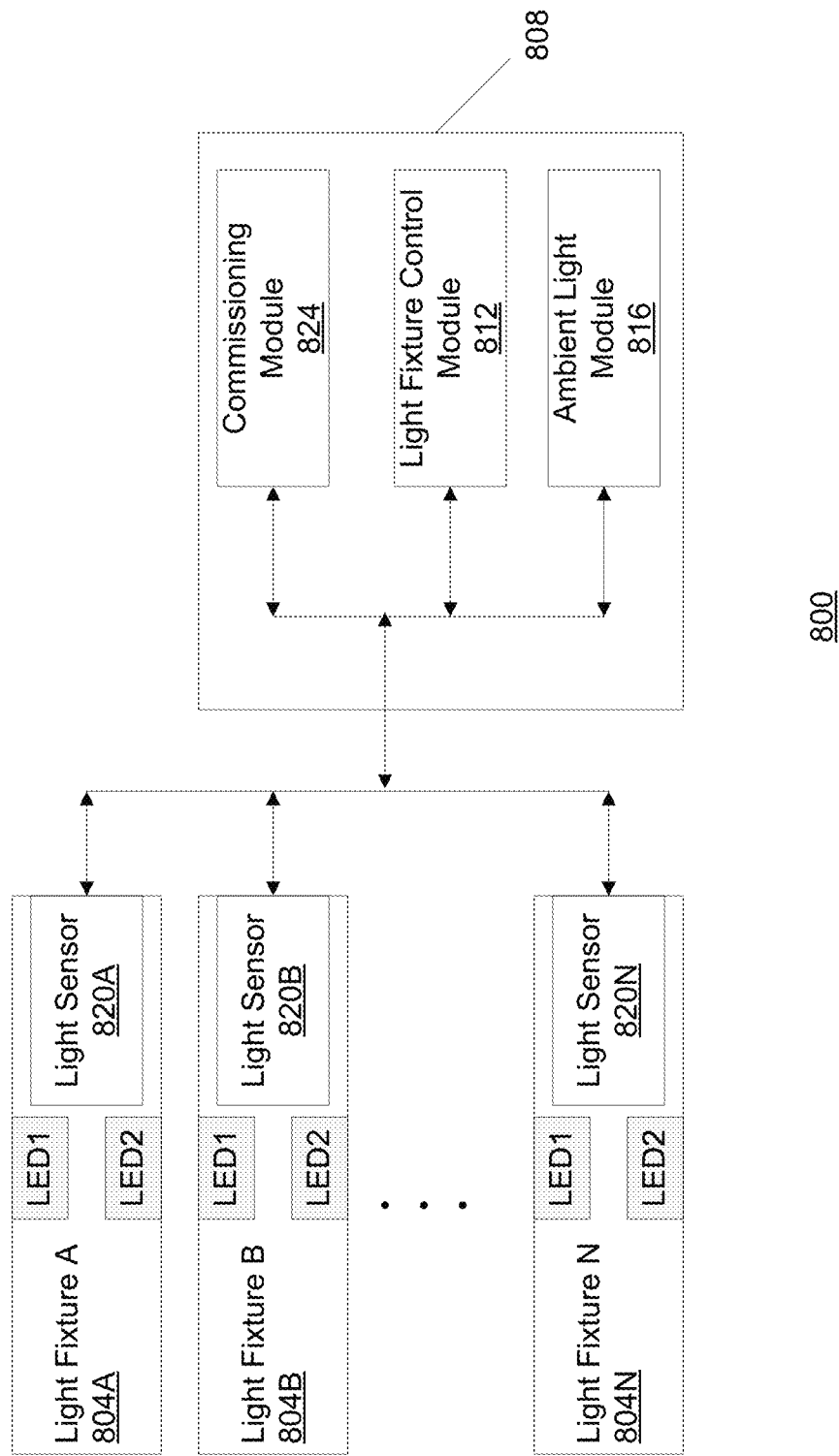
FIG. 8B is block diagram of a lighting system commissioning system, according to another illustrative embodiment.

FIG. 8A is block diagram of a lighting environment 800 that includes N light fixtures 804A, 804B ... 804N (generally 804) and a lighting system commissioning system 808, according to an illustrative embodiment. The system 808 includes a light fixture control module 812, an ambient light module 816, and a commissioning module 824. A light sensor is assigned to each light fixture 804. In this embodiment, the light fixtures 804 are LED light fixtures and the LEDs within the light fixtures 804 are used both for illumination and for sensing ambient light in proximity to the light fixtures 804. The LEDs are configured for illumination and sensing, similarly as described herein (e.g., with respect to FIGS. 7A and 7C). FIG. 8B illustrates an alternative embodiment, in which separate sensors 820A, 820B, ... and 820N (generally 820) are included with the light fixtures 804 to measure ambient light (rather than using the LEDs).

The light fixture control module 812 controls the operation of the light fixtures 804. The ambient light module 816 is configured to measure ambient light with the light sensor assigned to each light fixture 804. As described herein, in some embodiments it is desirable to command light fixtures to be in an off state when measuring ambient light in the location of the light fixtures. Accordingly, in some embodiments, the system 808 also includes a clock source generator (e.g., clock source generator 132 of FIG. 1), a monitoring module (e.g., monitoring module 116 of FIG. 1), a triggering module (e.g., triggering module 120 of FIG. 1), and a command module (e.g., command module 124 of FIG. 1). The combination of these modules is configured to synchronize the operation of the light fixtures 804 so the light fixtures 804 are not emitting light when making ambient light measurements. The commissioning module 824 is configured to designate each light fixture to a lighting group. The commissioning module 824 may, for example, designate light fixtures to particular lighting groups based on the ambient light measurements.

Figure 9A:
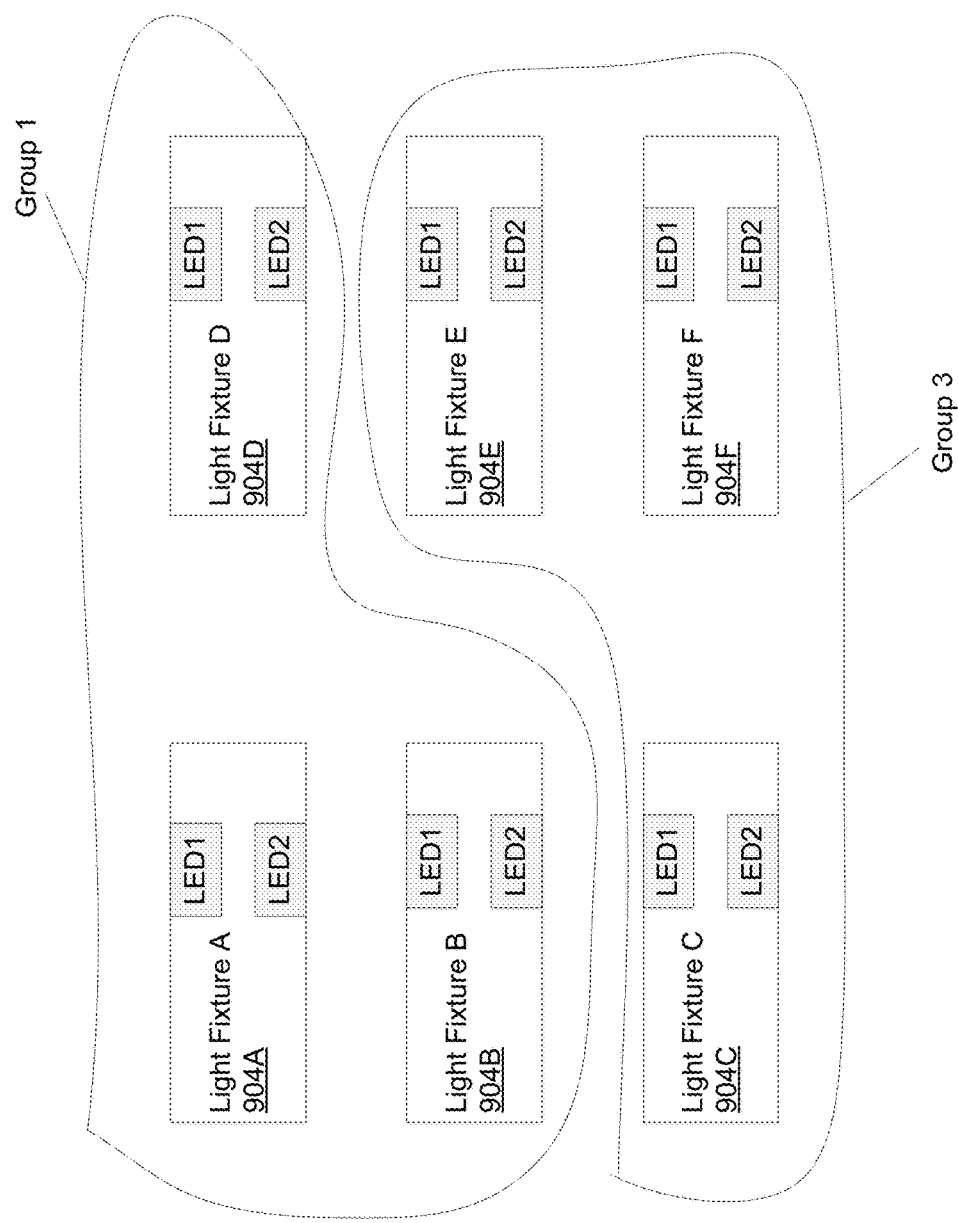
FIG. 9A is a schematic illustration of a light fixture grouping of light fixtures in a lighting system, according to an illustrative embodiment.
Figure 9B:
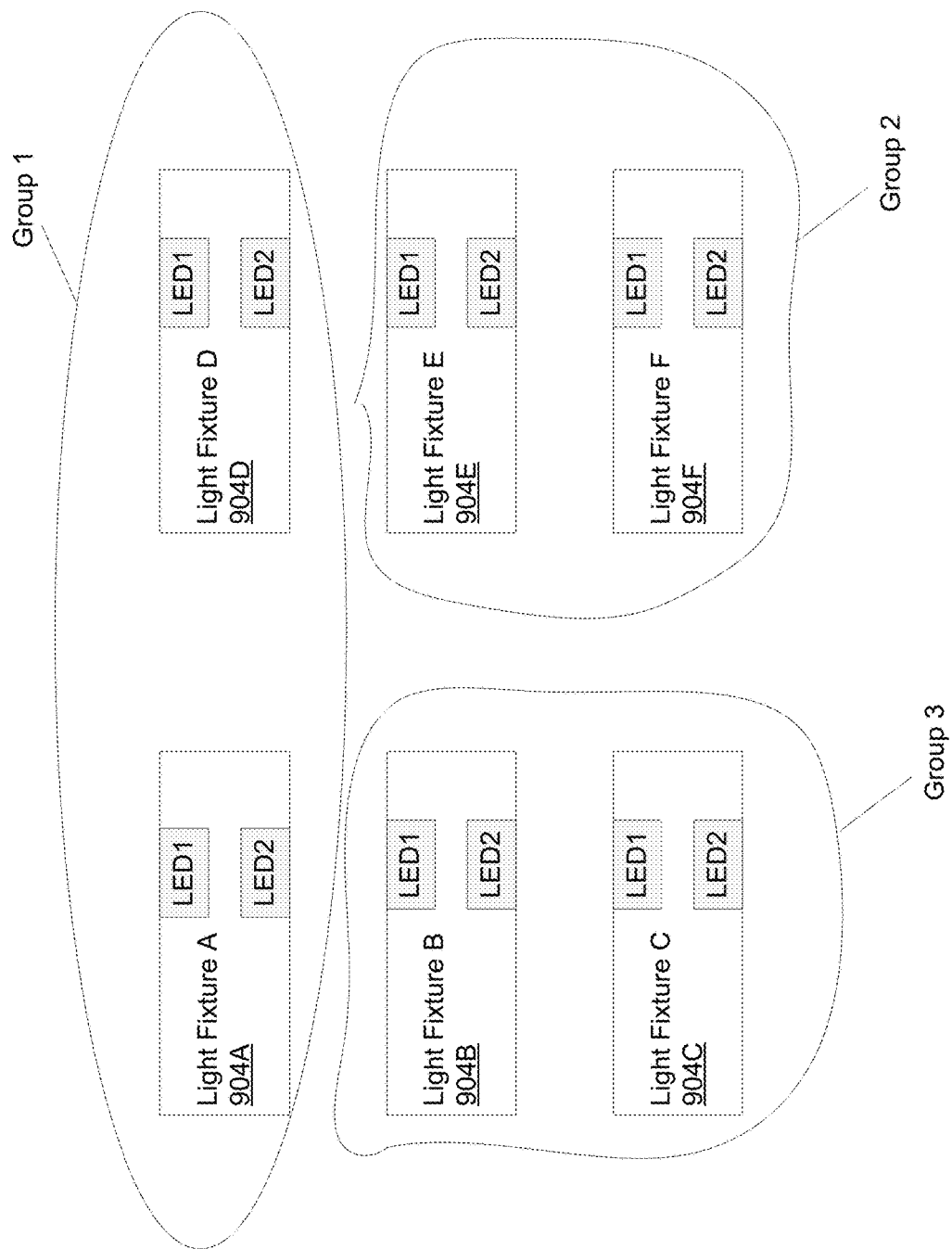
FIG. 9B is a schematic illustration of an alternative light fixture grouping for the lighting system of FIG. 9A.

FIGS. 9A and 9B are schematic illustrations of light fixture groupings of light fixtures 904A, 904B, 904C, 904D, 904E, and 904F (generally 904), according to an illustrative embodiment. Referring to FIG. 9A, initially, one LED from each of the light fixtures 904 is configured to measure ambient light. Table 2 lists the light intensity measured using LED1 of each of the light fixtures.

TABLE 2

Initial Ambient Light Measurement

| Light Fixture | Light Intensity (Lumens) |
|---|---|
| 904A | 12 |
| 904B | 10 |
| 904C | 30 |
| 904D | 15 |
| 904E | 35 |
| 904F | 40 |

The commissioning module 824 may group the light fixtures 904 based on a variety of different criteria. In this embodiment, the commissioning module 824 is configured to group fixtures based on the following criteria: Group 1 (light intensity<20 lumens); Group 2 (20 lumens≤light intensity<40 lumens); Group 3 (light intensity≥40 lumens). The purpose for grouping the light fixtures 904 is, in this embodiment, to create groups of fixtures that are dimmed together during the course of the day. For example, because the light sensors for each fixture within a group measured ambient light intensities that were relatively closely matched, it might be desirable and beneficial to dim them in a similar manner.

In some embodiments, after the light fixtures have been grouped, the commissioning module 824 also specifies a single light sensor to be used as a light sensor for determining how and/or when to dim the group of light fixtures. For example, during the middle of the day it may be desirable to dim a group of light fixtures in an area of a building that get exposed to a considerable amount of natural light. Later in the day, as that group of light fixtures is exposed to less natural light, it may be desirable to increase the output intensity of the light fixtures in that group of light fixtures.

Referring to FIG. 9B, the system is configured to modify the grouping of light fixtures. For example, it may be desirable to monitor ambient light levels over the course of a period of time (e.g., month, year) to determine how ambient light changes during that time period. If the ambient light varies, the system may regroup the light fixtures. Table 3 lists the light intensity measured using LED1 of each of the light fixtures at another point in time. Light fixtures 904A and 904D are in Group 1, light fixtures 904E and 904F are in Group 2, and light fixtures 904B and 904C are in Group 3.

TABLE 3

Subsequent Ambient Light Measurement

| Light Fixture | Light Intensity (Lumens) |
|---|---|
| 904A | 12 |
| 904B | 42 |
| 904C | 44 |
| 904D | 15 |
| 904E | 22 |
| 904F | 30 |

There are many implementations where an LED can be used as a light sensor. LEDs can be used as ambient light sensors in various light fixture applications. Fixture electronics sense voltage differentials in the LEDs that correlate to ambient light using the same LEDs that are used for illumination of the fixture. In one embodiment, the LED is used as a light sensor for occupancy sensing; where the light measured by the LED varies if a subject is located in the field of view of the LED or if a subject passes through the field of view. In some embodiments, the LED is used as a light sensor to monitor or detect smoke/fog in, for example, safety situations.

The technology described works with any type of LEDs (e.g., red, amber, green, blue, and white). The resolution of an LED as a light sensor changes from LED to LED due to the specific characteristics of the LED type. For example, a red LED has a natural forward voltage of 2.2V, so resolution of ambient light will be different than other LEDs that have forward voltage of 3V-3.3V (e.g., green, blue and white LEDs). Also, white LEDs have different characteristics than the colored LEDs because a white LED has a phosphor coating over its royal blue die, which will block some of the ambient light read by the LED. This is also true with frosted lenses or diffusers that are sometimes used with LEDs. The applicable aspect of this however is that this only changes the resolution of the ambient sensor, as light will naturally get through quite efficiently. For example, reading ambient light with a blue LED may give a voltage of 0V-2V depending on the amount of light available, where a white LED with phosphor may only yield a resolution of 0V-1.2V.

The opposite is true for secondary optics that may be between the LED source and the ambient light. The focused optics will actually increase the resolution of ambient light measured because it is focusing the light in a particular direction (same thought as emitting light, receiving is through same optical properties).

In some embodiments, measurement and calibration techniques are applied to LED fixtures in which one or more of the LEDs are used as light sensors. One way to calibrate the LEDs involves using the off time in the pulse width modulating (PWM) cycle of the LED illumination signal and measure the voltage across one or more of the LEDs when the LEDs are non conducting (using them as sensors). In this implementation, the period and duty cycle of the signals can be adjusted such that when the fixture is at full output, the PWM signal is not at 100% duty cycle; allowing time available to measure the voltage of the LEDs when the LEDs emission signals are in the off state. There will be variation in the voltage created by an LED and correlating to ambient light will be affected depending on what type of LED, secondary optic, and/or lens is being used with an LED.

Calibration of the LEDs can be automatically done, or, alternatively use predetermined calibration constants that are used or set at manufacturing depending on specific fixture characteristics (i.e., if a tight 6 degree or 10 degree secondary optic is used on the output of the LED, the resolution of the LED as a sensor will be greater than if that same LED had no secondary optic). LED performance as a sensor will vary based on other properties of the LED. For example, white LEDs function differently than red, green, and blue LEDs because of the phosphor material used. This results in white LEDs having less resolution in the voltage signal generated by the LED under the same ambient light levels.

Figure 10:
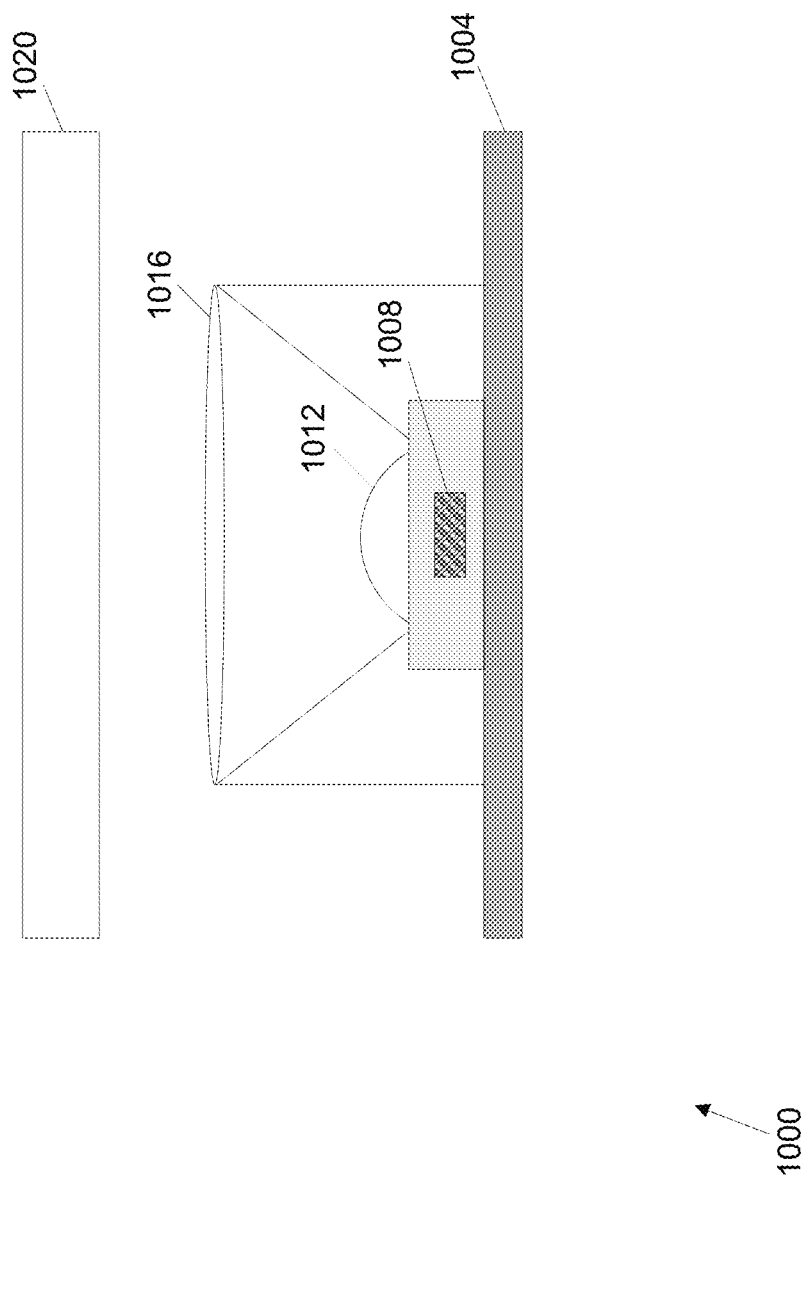
FIG. 10 is a schematic illustration of components of an LED light fixture, according to an illustrative embodiment.

When using an LED that is emitting light as a light sensor also, there are many characteristics that need to be taken into account in order to correlate the ambient light measured to the ambient light in the environment that the fixture is in. These characteristics are variable depending on the fixture system. The main variables associated with trying use an LED from an LED fixture as ambient light are: forward voltage of the LED, voltage of reverse protection diode inside each LED, phosphor on the LED package, properties of secondary optics, and properties of tertiary optics. FIG. 10 is a schematic illustration of components of an LED light fixture 1000 that is used to illustrate the different components of a light fixture that affect its use as a sensor. The light fixture 1000 includes a printed circuit board (PCB) 1004 on which the components are mounted. The components are an LED die 1004, phosphor material 1012 for, for example, white LEDs, secondary optics 1016, and tertiary optics/materials 1020.

LEDs of different technologies will vary in forward voltage. For instance, some red and amber colored LED dies 1008 are based on, for example, Aluminum Gallium Arsenide (AlGaAs) technology, which leads their forward voltage to be in the 2.0V-2.2V range. Blue, White, and Green LED dies 1008, however, use a different technology (e.g., Indium Gallium Nitride (InGaN) technology, and their forward voltage ranges from 2.8-3.5V. This different in voltage is a huge margin. This is even more significant when talking about the forward voltage differences inside a particular yield of LEDs. Using white LEDs as an example, you can see the variability in forward voltage can range upwards to 30%-35%. This is drastic, and hard to control in manufacturing. Therefore this forward voltage needs to be measured and quantified.

Almost all high power LEDs used in lighting today have a reverse protection diode in parallel to the LED inside the package. This diode is usually a schottky diode, and voltage drop (in reverse direction from normal current path), will be anywhere from 0.2V-0.6V. This variability is important, because when using a high power LED as a sensor (by, for example, reverse biasing the LED package by passing current thru it in the opposite direction), the voltage drop of the schottky diode at this point will need to be taken into consideration to provide proper reverse bias current.

Regarding white LEDs (and white emitting LED fixtures), there are two other variables that combined play a significant role in measuring ambient light. Since all white LEDs are only a royal blue LED with a phosphor coating 1012, the nm variation in the royal blue can have an effect in the amount of light the LED can sense when used as a light sensor. Most royal blue nanometer ranges for blue LEDs are in the 450-460 nm range. Phosphor, however, has a huge effect on performance, depending on the amount of phosphor, or the type of phosphor. Phosphor is used to change the apparent color temperature or tint that a particular LED may emit. This places a huge role in light detection when being used as a light sensor. For example, more phosphor is used when trying to turn the royal blue LED into a warm color temp of white, say 2700K or 3000K, than a cooler LED, say 5700K or 6500K. This also explains why cooler color temp LEDs are ultimately more efficient and emit more light, as there is less phosphor material applied 1012, and hence less light loss in transmission. The same principle applies when considering light detection properties of the LED.

Many types of LED fixtures have, in addition to a lens on the physical LED package, a secondary optics 1016 (e.g., lenses) to provide additional focus and directionality of the light. These lenses can vary in beam width, shape and angle. The optics have an effect on the sensitivity and gain of the LED when used as a light sensor. Examples include a conical 6 degree beam and an asymmetric 10 degree by 60 degree projection. When using the LEDs as sensors this will also affect the amount and angle of light incident on the LED. These factors need to be considered when correlating the expected ambient light over an area based on the measured light on the LED through the optics.

The materials used to manufacture the focusing lenses will change the amount and spectra of any light that gets through to the LED. Glass, polycarbonate and other materials will act as filters and pass different frequencies of light depending on their material properties (e.g., clear, frosted, diffuser coating, spread lens). Some lighting fixtures will have an additional cover (e.g., tertiary optical elements) for physical protection of the LED assemblies and in some cases it will also act as an additional diffusing lens. The material properties and amount of diffusion will affect the amount, directionality and spectra of the ambient light that gets to the LEDs.

Figure 11:
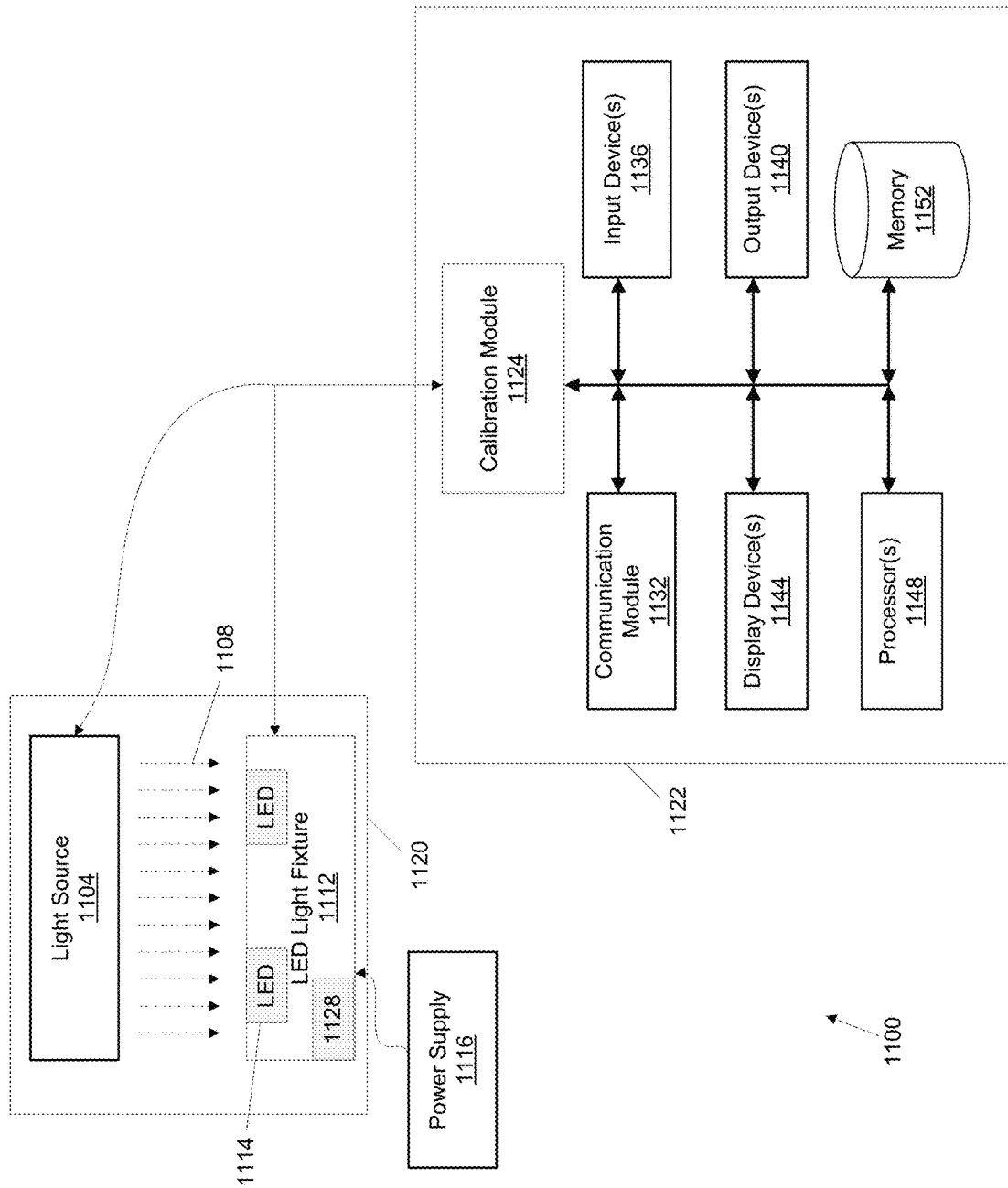
FIG. 11 is a schematic illustration of an LED light fixture calibration system, according to an illustrative embodiment.

FIG. 11 is a schematic illustration of an LED light fixture calibration system 1100, according to an illustrative embodiment. The calibration system can be used to, for example, calibrate a light fixture based on the properties/parameters described above with respect to FIG. 10. The system 1100 includes a light source 1104 for generating a reference light output 1108 for calibrating one or more LED light fixtures 112. The light source 1104 can be any controllable light source that outputs light (e.g., a traditional light fixture, incandescent light bulb, a calibrated piece of lab equipment). In this embodiment, the light source 1104 is a controllable, calibrated light source that outputs multiple known light levels. In alternative embodiments, a separate light sensor can be used in conjunction with the system 1100 to measure the output of the light source 1104 during testing. The light source 1104 and LED light fixture 1112 are located within an enclosure 1120. The enclosure 1120 prevents ambient light from impinging on the light source 1104 or LED light fixture 1112 during calibration. The enclosure 1120 therefore enables the system 1100 to calibrate the LED light fixture 1112 in the absence of ambient light.

During calibration, a power supply 1116 provides power to the LED light fixture 1112 to operate the fixture. The system 1100 also includes a control system 1122. The control system 1122 includes a calibration module 1124, a communication module 1132, one or more input devices 1136, one or more output devices 1140, one or more display devices 1144, one or more processors 1148, and memory 1152. The modules and devices described herein can, for example, utilize the processor 1148 to execute computer executable instructions and/or the modules and devices described herein can, for example, include their own processor to execute computer executable instructions. It should be understood the control system 1122 can include, for example, other modules, devices, and/or processors known in the art and/or varieties of the described modules, devices, and/or processors.

Figure 12:
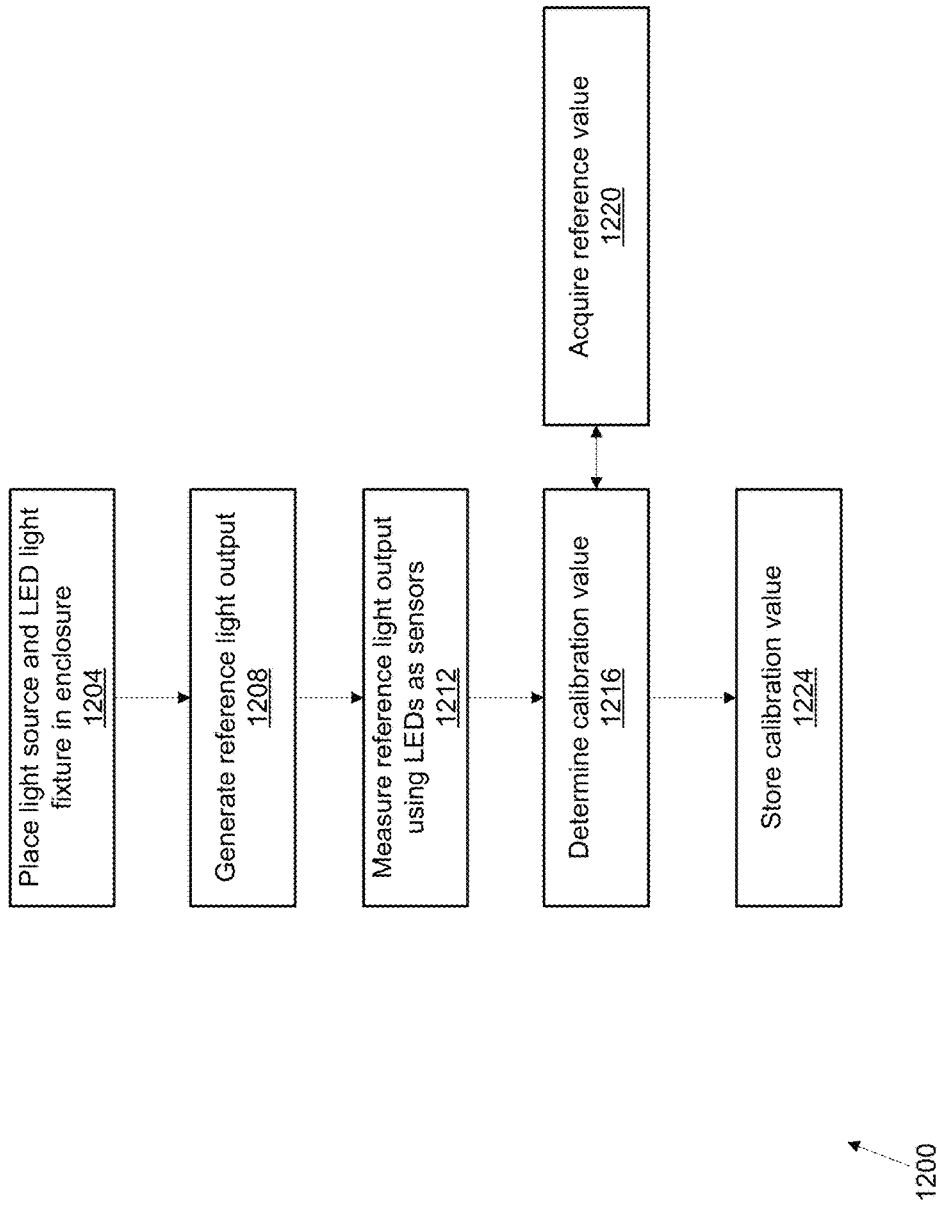
FIG. 12 is a flowchart of a method for calibrating an LED light fixture, according to an illustrative embodiment.

The calibration module 1124 performs various functions to calibrate the LED light fixture (as described, for example, with respect to FIG. 12). The communication module 1132 includes circuitry and code corresponding to computer instructions that enable the control system 1122 to send/receive signals to/from, for example, the light source 1104 and LED light fixture 1112. For example, the communication module 1132 provides commands from the processor 1148 to the calibration module 1124 to control how the light source 1104 transmits light within the enclosure 1120 during operation. The communication module 1132 also, for example, receives data corresponding to the light measured by the LEDs in the LED light fixture 1112. The received data can be, for example, stored by the memory 1152 or otherwise processed by the processor 1148.

The input devices 1136 receive information from a user (not shown) and/or another computing system (not shown). The input devices 1136 can include, for example, a keyboard, a scanner, a microphone, a stylus, a touch sensitive pad or display. The output devices 1140 output information associated with the control system 1122 (e.g., information to a printer, information to a speaker, information to a display, for example, graphical representations of information). The processor 1148 executes the operating system and/or any other computer executable instructions for the control system 1122 (e.g., executes applications). The memory 1152 stores a variety of information/data, including profiles used by the control system 1122 to specify how the system 1100 calibrates a light fixture. The memory 1152 can include, for example, long-term storage, such as a hard drive, a tape storage device, or flash memory; short-term storage, such as a random access memory, or a graphics memory; and/or any other type of computer readable storage.

FIG. 12 is a flowchart 1200 of a method for calibrating an LED light fixture using, for example, the system 1100 of FIG. 11. The method includes placing the light source 1104 and the LED light fixture 1112 into the enclosure 1120 (step 1204). By placing the light source 1104 and the LED light fixture 1112 within the enclosure 1120, the calibration steps can be performed in the absence of ambient light. The method also includes generating the reference light output 1108 from the light source 1104 (step 1208). In some embodiments, the processor 1148 executes instructions that cause the calibration module 1124 to command the light source 1104 to generate the reference light output 1108.

The method also includes measuring the reference light output 1108 from the light source 1104 by using one or more LEDs 1114 in the light fixture 1112 as light sensors (step 1212). In some embodiments, each LED of a plurality of LEDs in the LED light fixture 1112 acquires a different reference light output measurement. The calibration module 1124 sends commands to the LED light fixture 1112 to cause the LEDs 1114 to function as sensors (e.g., similarly as described herein). By using the LEDs in the light fixture 1112 as sensors, it is possible to calibrate the light fixture to account for, for example, the variation in LED performance described above with respect to FIG. 10. This involves shining predetermined, fixed, various ambient light sources of known characteristics into the fixture, through all the variables listed above. From there the fixture can automatically calibrate itself to the correct parameters and offsets, essentially teaching itself what are its own variable characteristics.

The method then includes determining a calibration value (step 1216) by comparing the reference light output measurement to a reference value. In this embodiment, the system 1100 acquires the reference value (step 1220) from the memory 1152. In embodiments where multiple LEDs are used, the method involves determining a calibration value for each LED in the LED light fixture by comparing the reference light output measurement of each LED to a reference value.

In some embodiments, the reference values are stored in memory. These values are used in an equation as multipliers or gain values (i.e., if an ambient light reading outside the fixture is a known number, say 100 lux, and what is measure at the LED level is 35 lux, obviously there is 65 lux that is lost through the different materials and processes of the LED fixture along the way. If you know the frosted lens is approximately lux loss of 15 lux, plus the phosphor is a loss of 30 lux and the diffusion lens is a loss of 20 lux, that stack up is what amounts to the losses seen. So the microprocessor will know that the 35 lux it is reading refers to 100 lux as a magnitude of scale. The next fixture being built might be without a diffuser, so the same 100 lux measurement corresponds to 55 lux at the LED level, and the microprocessor knows the material offsets to calibrate for the different material stackups. These values will either be stored as individual values (i.e. 15%, +30%, +20%) for the system, or as one cumulative percentage value stored in one memory location, with the addition of the stackups done on the software side.

Application of the calibration value to the operation of the LED light fixture 1112 causes the LED light fixture 1112 to operate having properties associated with the reference value (e.g., that allow the LED light fixture to be used to properly and accurately measure light intensity, light color, light temperature, combinations of same). As explained above, the calibration values will be offsets associated with the stackup of materials from the ambient light sources on the outside of the fixture, through all the levels of loss (or gain in the case of tight optics) to where the light is capable of being read at the LED level.

The method also includes storing the calibration value (step 1224) in memory 1128 associated within the LED light fixture 1112. The stored calibration value(s) can be, for example, accessed and used by a light fixture control system when installing the LED light fixture 1112 in the field.

Figure 13:
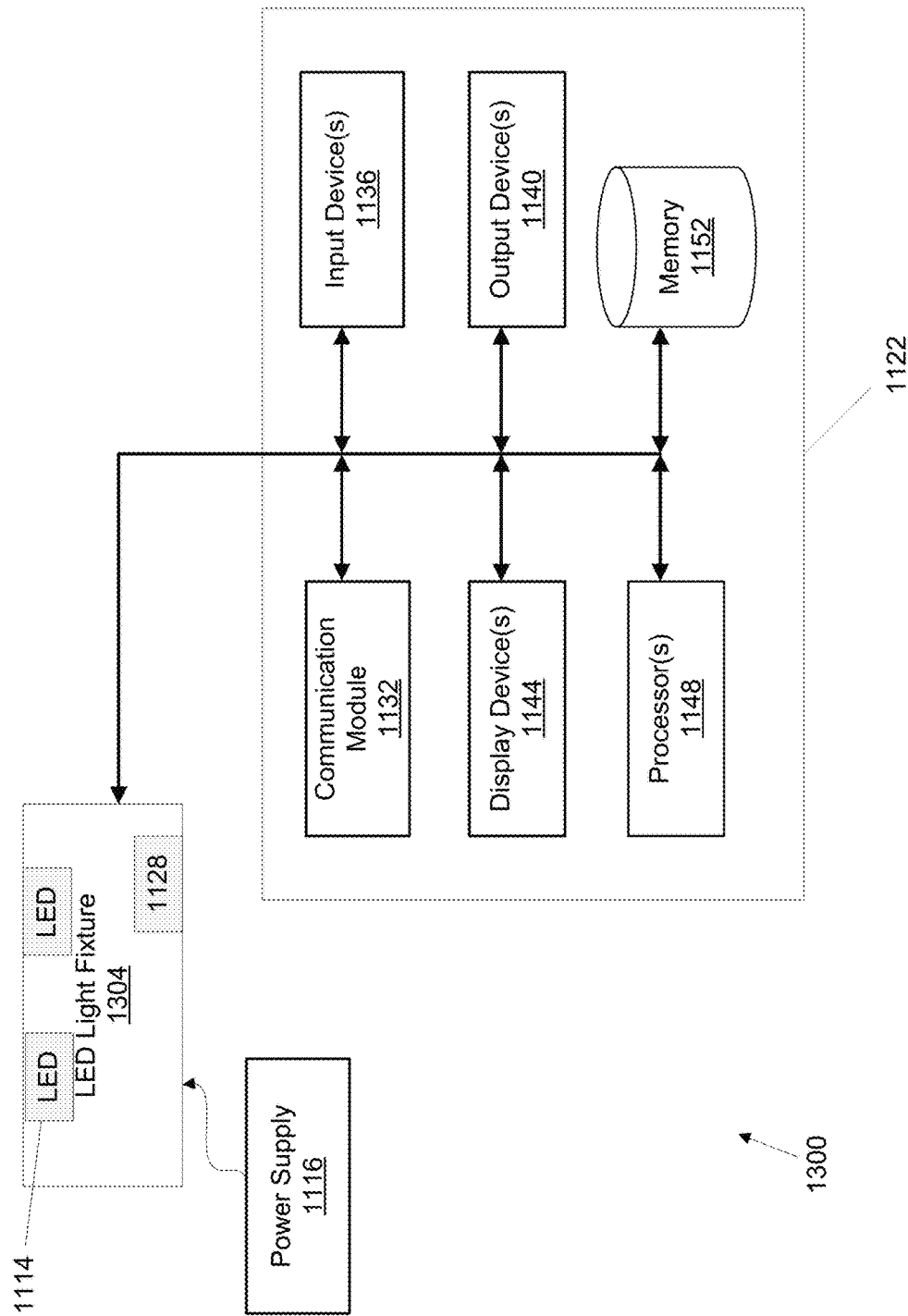
FIG. 13 is a schematic illustration of an LED light fixture calibration system, according to an illustrative embodiment.

FIG. 13 is a schematic illustration of an LED light fixture calibration system 1300, according to an illustrative embodiment. In this embodiment, the system 1300 is used to enter calibration constants into the memory 1128 of an LED light fixture 1304 at manufacturing time. These constants tell the fixture what type of fixture it is as well as all of its characteristics detailed above in FIG. 10. The stored information is used during installation of the light fixture in order to give it the correct offsets to adjust the measured value to correlate to an actual value. In some embodiments, the system 1300 also can be used by an operator to choose/specify the components that are known to be used within a specific light fixture. The operator can, for example, use an input device 1136 to specify the specific components within the LED light fixture 1304, so that nominal calibration constants (e.g., white LED with nominal forward voltage of 3.0 volts, 6 degree secondary optic, reverse current of 250 mA) can be stored within the memory 1128 of the LED light fixture.

Another implementation involves having each fixture be its own ambient light sensor. The system then adjusts the light output of the corresponding LED based on light level measured by the corresponding LED. This allows for maximum energy savings in the system because each fixture can be automatically controlled and altered. Another implementation involves having ambient light sensing available on every fixture. However, when the light fixture is commissioned (e.g., installed at the work site) the PLC is configured to enable only certain fixtures to serve as ambient light sensors for that particular installation, these ambient light readings will report back to a centralized control unit to control groups of fixtures all together. In some implementations, a single LED is used to measure the ambient light instead of a string of LEDs. An advantage of using a string of LEDs is it increases the resolution of the ambient light measurement by adding up the sum of the LEDs in the string.

There are additional ways of figuring out that you are in the off state that will give very accurate results. Since you can measure the voltage real time, you will know when you are on (high voltage like 20V), and then also when you are off, (0-2V). Based on your difference in measurements you can act accordingly. You also know the duty cycle of your PWM controlling your LEDs. So you have 2 methods of verification that the LEDs are in the "off" state. The second advantage is that, by default, since you are measuring the voltage when the LEDs are in the off state, you are able to measure true ambient light, because the fixture is "off", you are truly only measuring the ambient light around the fixture.

With the ability to capture ambient light measurements on the fixture itself, using power line communication one way to transfer/communicate the ambient light data to other light fixtures, as well as a centralized controller. This removes any need for outside communication with daylight harvesting sensors. Since it is all part of the fixture in this embodiment, it is embedded in the communications protocol as just another piece of data that can be retrieved from fixtures. From there, calculations can be made about light fixtures and their surroundings, where every fixture could be its own light sensor and all fixtures in the network can be averaged to get an ambient light level for a space. Alternatively, during commissioning, only a handful (or 1) fixture could be configured as the ambient light sensor for the group and all readings and adjustments can be made based on that fixture's light readings.

Power line communication provides other advantages because system that employ PLC are able to report back to the system key diagnostic data such as temperature, power, LED lifetime, power supply lifetime, etc.

The above-described systems and methods can be implemented in digital electronic circuitry, in computer hardware, firmware, and/or software. The implementation can be as a computer program product. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Transmitting devices can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for calibrating an LED light fixture having at least one LED for emitting light from the LED light fixture, the method comprising:
    positioning the LED light fixture in proximity to a separate reference light source;
    generating a reference light output from the reference light source, such that the reference light output impinges on the at least one LED in the LED light fixture;
    measuring the reference light output from the reference light source using the at least one LED in the LED light fixture as a light sensor; and
    determining a calibration value by comparing the reference light output measurement to a reference value, such that by application of the calibration value to the operation of the LED light fixture, the LED light fixture will operate having properties associated with the reference value.

2. The method of claim 1, comprising storing the calibration value in a memory associated with the LED light fixture.

3. The method of claim 1, comprising placing the light source and LED light fixture in an enclosure and, in the absence of ambient light, generating the reference light output and measuring the reference light output.

4. The method of claim 1, wherein measuring the reference light output from the light source includes measuring the reference light output using the plurality of LEDs in the light fixture as light sensors, wherein each LED of the plurality of LEDs acquires a reference light output measurement.

5. The method of claim 4, comprising determining a calibration value for each LED in the LED light fixture by comparing the reference light output measurement of each LED to a reference value.

6. The method of claim 5, comprising storing each LED's calibration value in a memory associated with the LED light fixture.

7. The method of claim 1, wherein, by application of the calibration value to the operation of the LED light fixture, the LED light fixture will sense light having properties associated with the reference value.

8. The method of claim 1, wherein measuring the reference light output from the light source includes measuring the reference light output using the plurality of LEDs in the light fixture as light sensors, wherein the plurality of LEDs is configured as a string of LEDS to acquire the light output measurement.

9. An LED light fixture calibration system, the LED light fixture having at least one LED for emitting light from the LED light fixture, the system comprising:
    a reference light source separate from the LED light fixture, the reference light source being adapted to generate a reference light output, such that the reference light output impinges on the at least one LED in the LED light fixture; and
    a calibration module coupled to the reference light source and the LED light fixture, wherein the calibration module measures the reference light output from the reference light source using the at least one LED in the LED light fixture as a light sensor and, wherein the calibration module determines a calibration value by comparing the reference light output measurement to a reference value, such that by application of the calibration value to the operation of the LED light fixture, the LED light fixture will operate having properties associated with the reference value.

10. The system of claim 9, comprising a processor for storing the calibration value in a memory associated with the LED light fixture.

11. The system of claim 9, comprising an enclosure in which the light source and LED light fixture are placed and, in the absence of ambient light, the light source generates the reference light output and the LED light fixture measures the reference light output.

12. The system of claim 9, wherein the LED light fixture has a plurality of LEDS and the LEDs measure the reference light output using the plurality of LEDs in the light fixture as light sensors, wherein each LED of the plurality of LEDs acquires a reference light output measurement.

13. The system of claim 12, wherein the calibration module determines a calibration value for each LED in the LED light fixture by comparing the reference light output measurement of each LED to a reference value.

14. The system of claim 13, wherein the processor stores each LED's calibration value in a memory associated with the LED light fixture.

15. The system of claim 9, wherein, by application of the calibration value to the operation of the LED light fixture, the LED light fixture will sense light having properties associated with the reference value.

16. The system of claim 9, wherein measuring the reference light output from the light source includes measuring the reference light output using the plurality of LEDs in the light fixture as light sensors, wherein the plurality of LEDs is configured as a string of LEDS to acquire the light output measurement.

* * * * *